(12) United States Patent
Nakamura

(10) Patent No.: US 10,001,934 B2
(45) Date of Patent: Jun. 19, 2018

(54) INFORMATION PROCESSING APPARATUS, INFORMATION PROCESSING SYSTEM, AND INFORMATION PROCESSING METHOD

(71) Applicant: Shuuichi Nakamura, Kanagawa (JP)

(72) Inventor: Shuuichi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 109 days.

(21) Appl. No.: 15/145,178

(22) Filed: May 3, 2016

(65) Prior Publication Data

US 2016/0328166 A1 Nov. 10, 2016

(30) Foreign Application Priority Data

May 8, 2015 (JP) ................................. 2015-095373
Apr. 22, 2016 (JP) ................................. 2016-085675

(51) Int. Cl.

| G06F 12/00 | (2006.01) |
|---|---|
| G06F 13/00 | (2006.01) |
| G06F 13/28 | (2006.01) |
| G06F 3/06 | (2006.01) |
| H04L 29/08 | (2006.01) |
| G06F 11/00 | (2006.01) |
| H04L 29/14 | (2006.01) |
| H04L 29/06 | (2006.01) |

(52) U.S. Cl.
CPC ............ *G06F 3/0619* (2013.01); *G06F 3/065* (2013.01); *G06F 3/067* (2013.01); *G06F 3/0631* (2013.01); *G06F 11/00* (2013.01); *H04L 67/02* (2013.01); *H04L 67/06* (2013.01); *H04L 67/146* (2013.01); *H04L 69/14* (2013.01); *H04L 69/40* (2013.01)

(58) Field of Classification Search
CPC ...... G06F 11/00; G06F 3/0619; G06F 3/0631; G06F 3/065; G06F 3/067
USPC ......................................................... 711/162
See application file for complete search history.

(56) References Cited

U.S. PATENT DOCUMENTS

| 7,069,401 | B1 * | 6/2006 | Noonan .............. G06F 11/1461 707/999.202 |
|---|---|---|---|
| 9,183,205 | B1 * | 11/2015 | Kurne ............... G06F 17/30073 |
| 9,575,968 | B2 * | 2/2017 | Wang ................ G06F 17/30017 |
| 2006/0149889 | A1 * | 7/2006 | Sikha .................. G06F 11/1469 711/100 |
| 2010/0128598 | A1 * | 5/2010 | Gandhewar ......... H04L 67/2814 370/217 |
| 2012/0016839 | A1 * | 1/2012 | Yueh .................. G06F 11/1435 707/624 |

(Continued)

FOREIGN PATENT DOCUMENTS

| JP | 5-191409 | 7/1993 |
|---|---|---|
| JP | 2005-063363 | 3/2005 |

*Primary Examiner* — Sheng-Jen Tsai
(74) *Attorney, Agent, or Firm* — Harness, Dickey & Pierce, P.L.C.

(57) ABSTRACT

An information processing apparatus includes a receiver that receives a request for starting backup of data stored in an information processing terminal, from the information processing terminal through a network, and circuitry that allocates a session for backing up data to the information processing terminal based on a number of sessions each performing backup using a file-sharing communication protocol.

9 Claims, 16 Drawing Sheets

(56) References Cited

U.S. PATENT DOCUMENTS

| | | | | |
|---|---|---|---|---|
| 2012/0084501 A1* | 4/2012 | Watanabe | G06F 11/3485 | 711/112 |
| 2013/0325809 A1* | 12/2013 | Kim | G06F 11/1451 | 707/640 |
| 2014/0052694 A1* | 2/2014 | Dasari | G06F 11/1461 | 707/654 |
| 2014/0122437 A1* | 5/2014 | Bosson | G06F 11/1458 | 707/652 |
| 2014/0136635 A1* | 5/2014 | Jeng | H04L 51/32 | 709/206 |
| 2014/0149695 A1* | 5/2014 | Zaslavsky | G06F 12/16 | 711/162 |
| 2015/0134717 A1* | 5/2015 | Naganuma | G06F 11/1464 | 709/201 |
| 2015/0172304 A1* | 6/2015 | Kleczynski | H04L 63/1416 | 726/23 |
| 2015/0293817 A1* | 10/2015 | Subramanian | G06F 17/30212 | 707/645 |
| 2015/0302025 A1* | 10/2015 | Apte | G06F 11/1448 | 707/652 |
| 2016/0191620 A1* | 6/2016 | Yasuda | H04L 67/1095 | 709/219 |
| 2016/0196218 A1* | 7/2016 | Kumar | G06F 11/1402 | 713/193 |

* cited by examiner

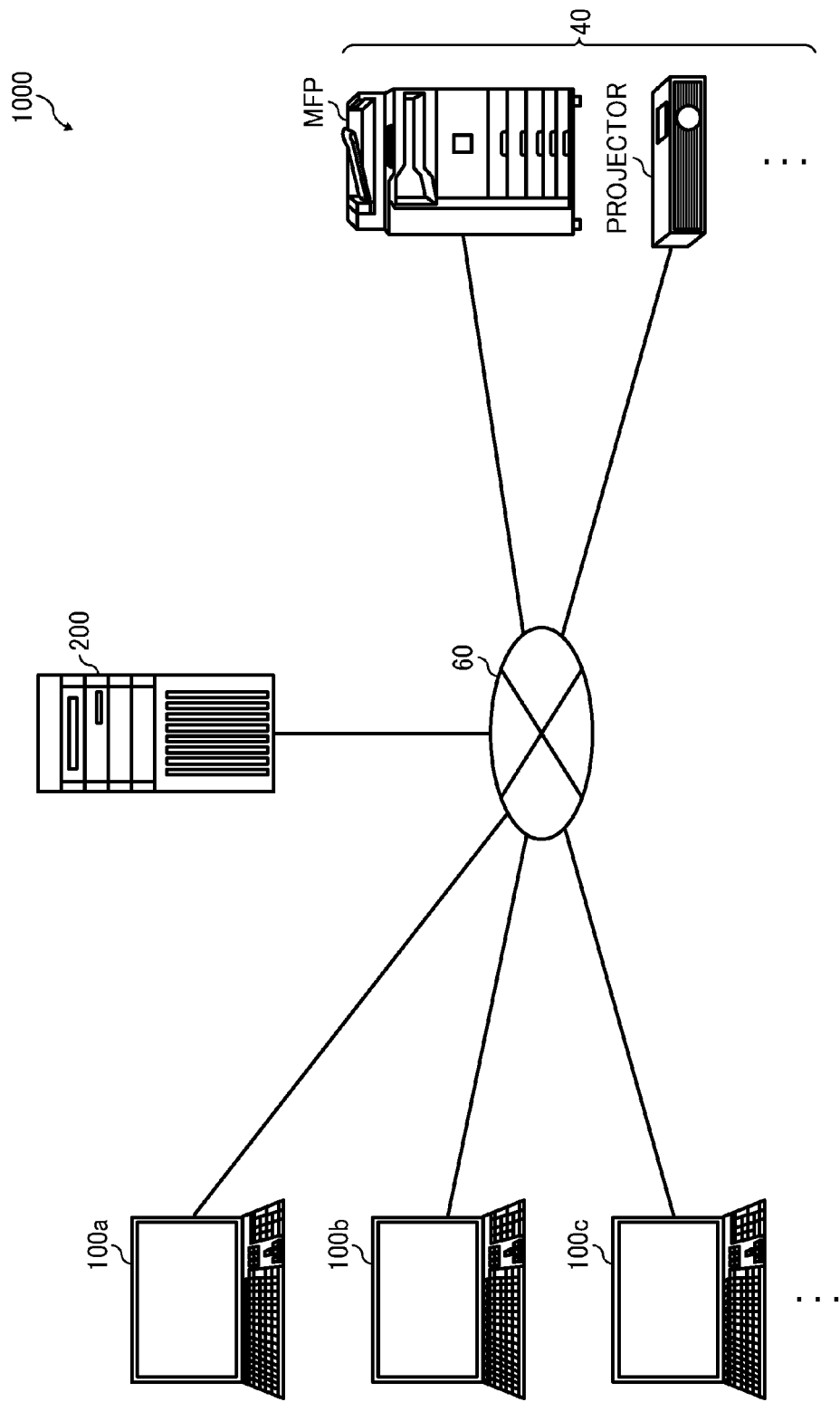

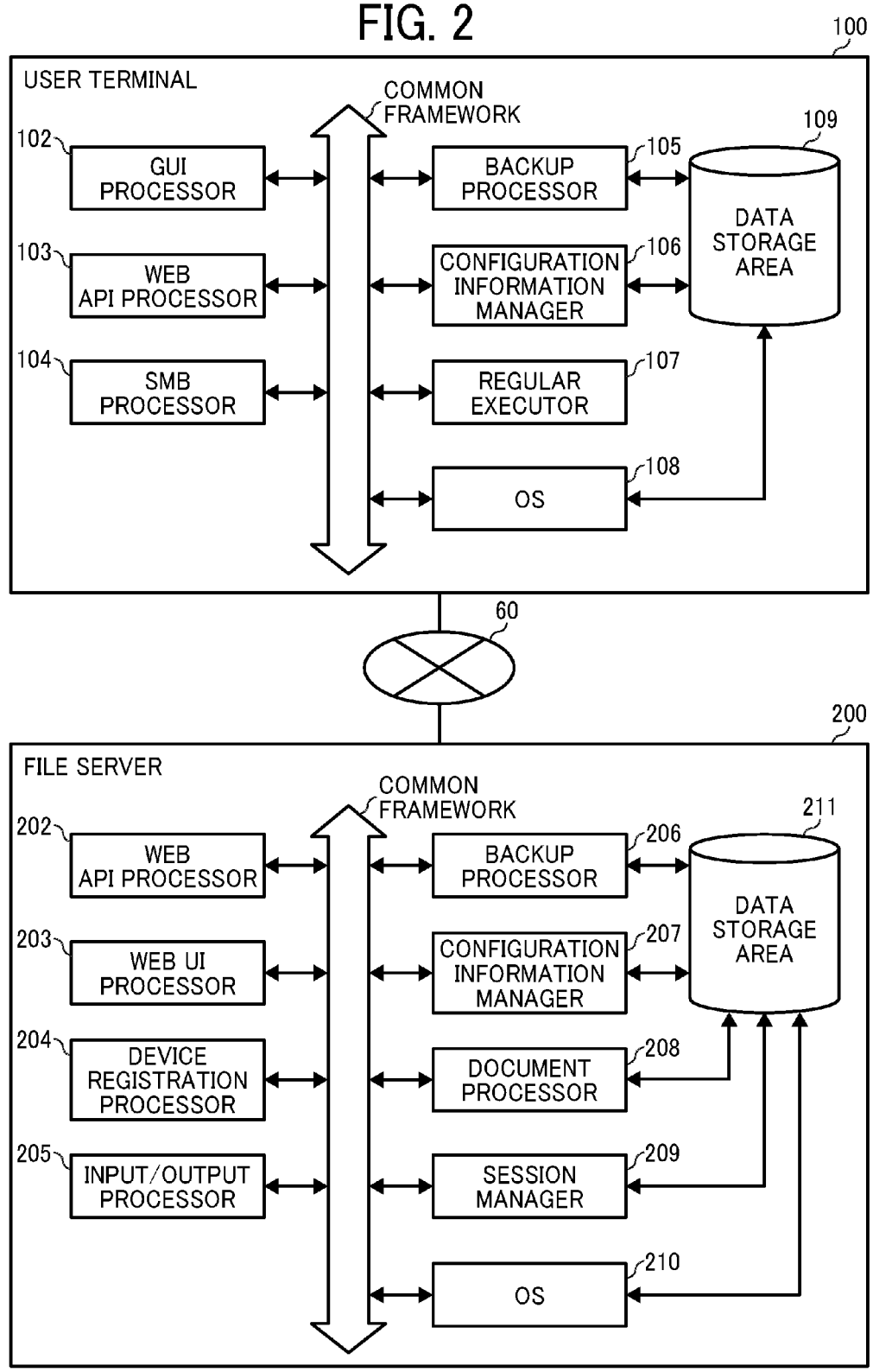

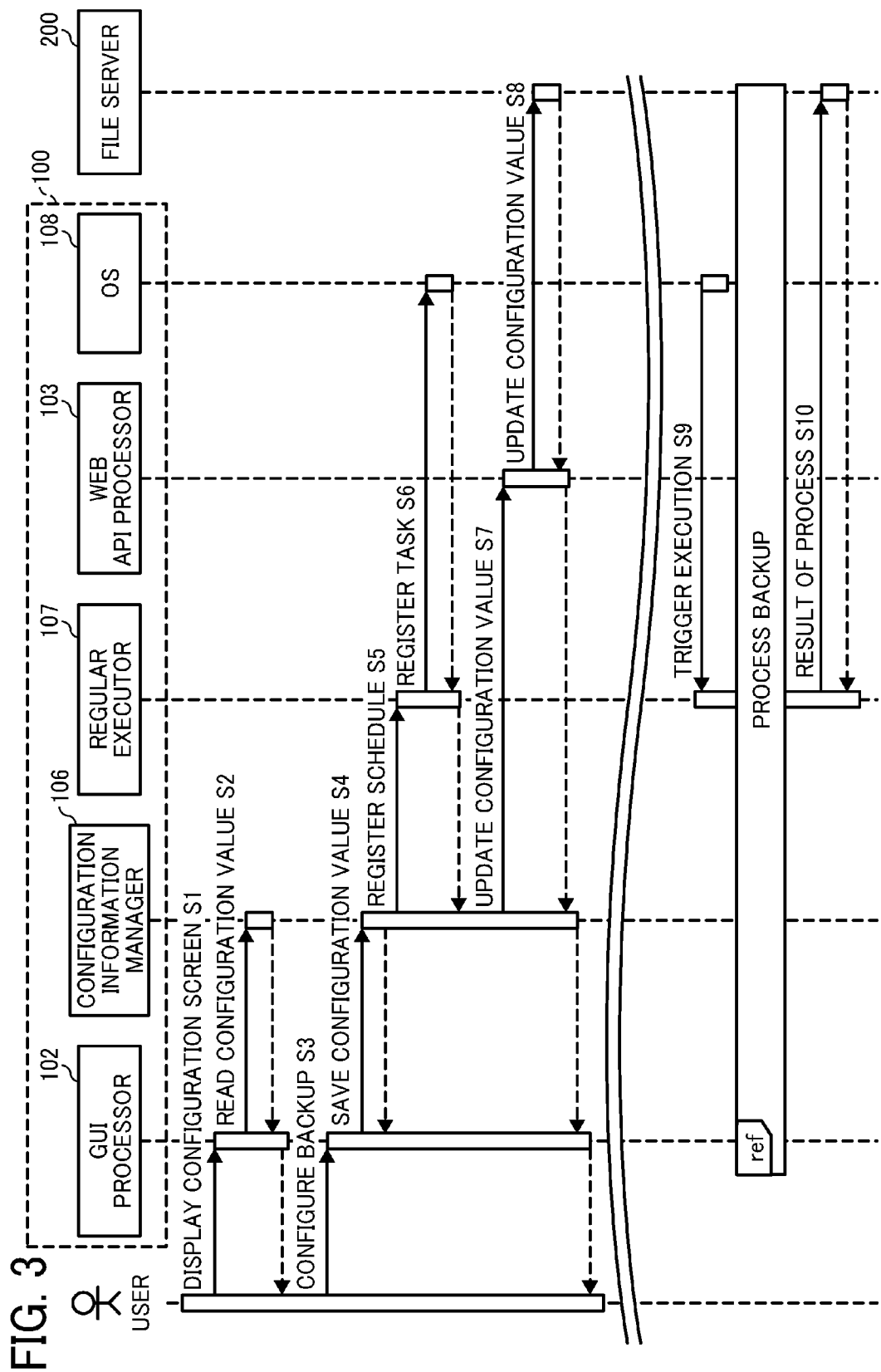

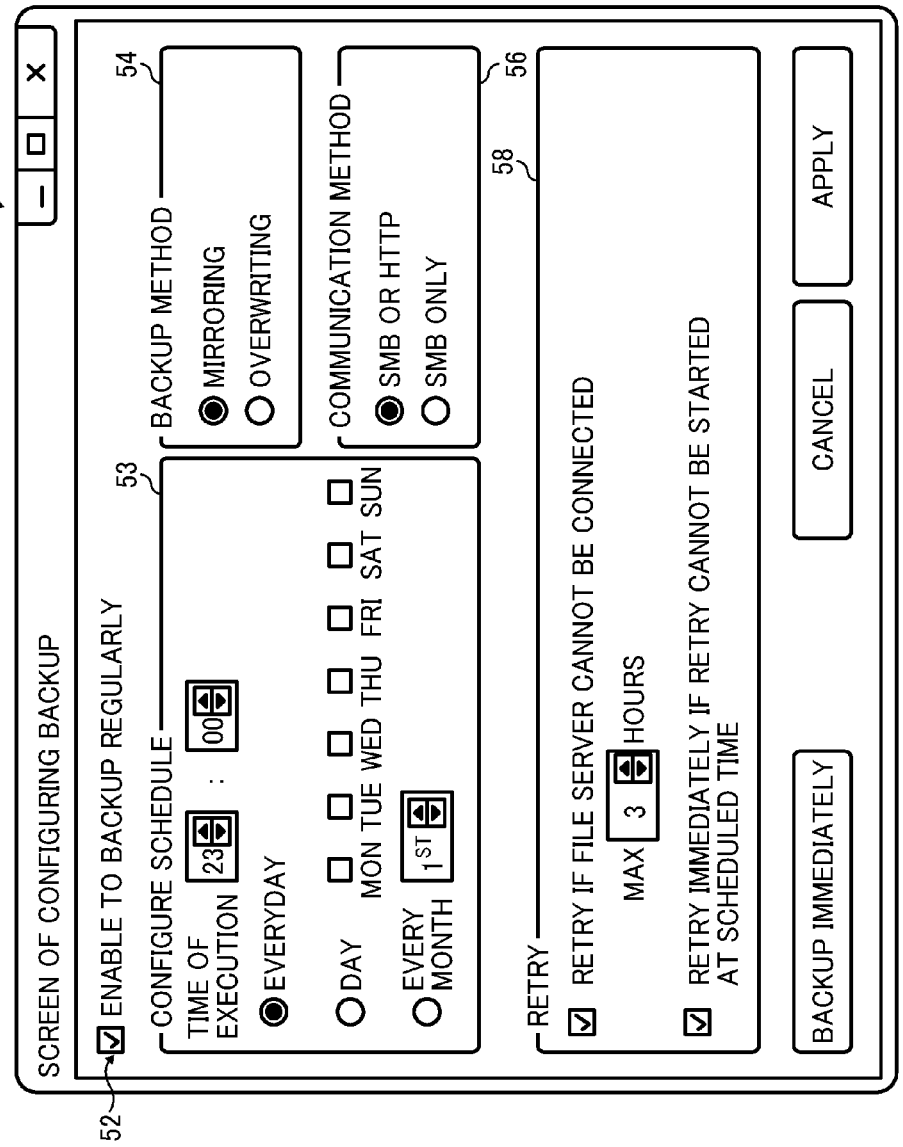

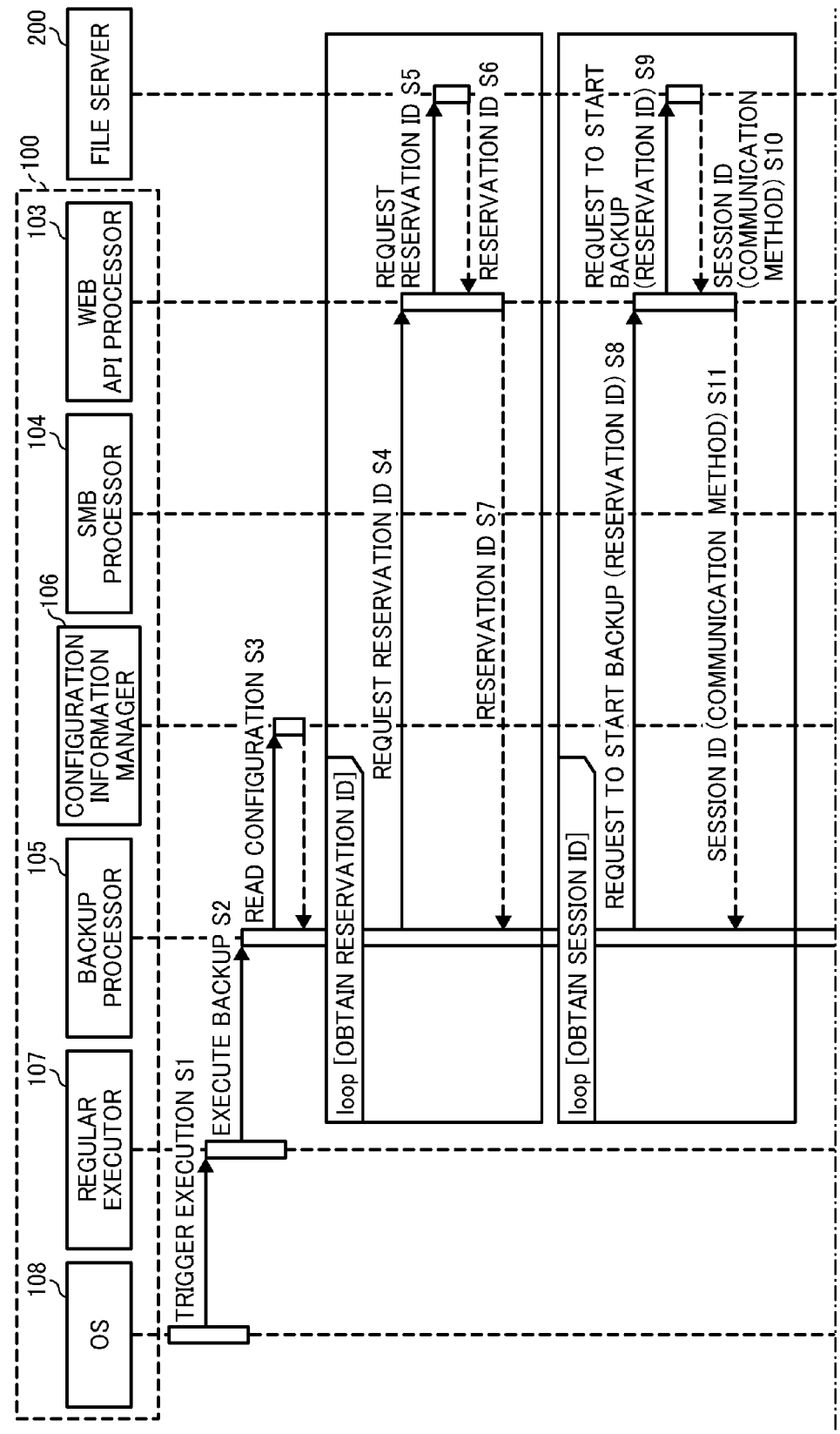

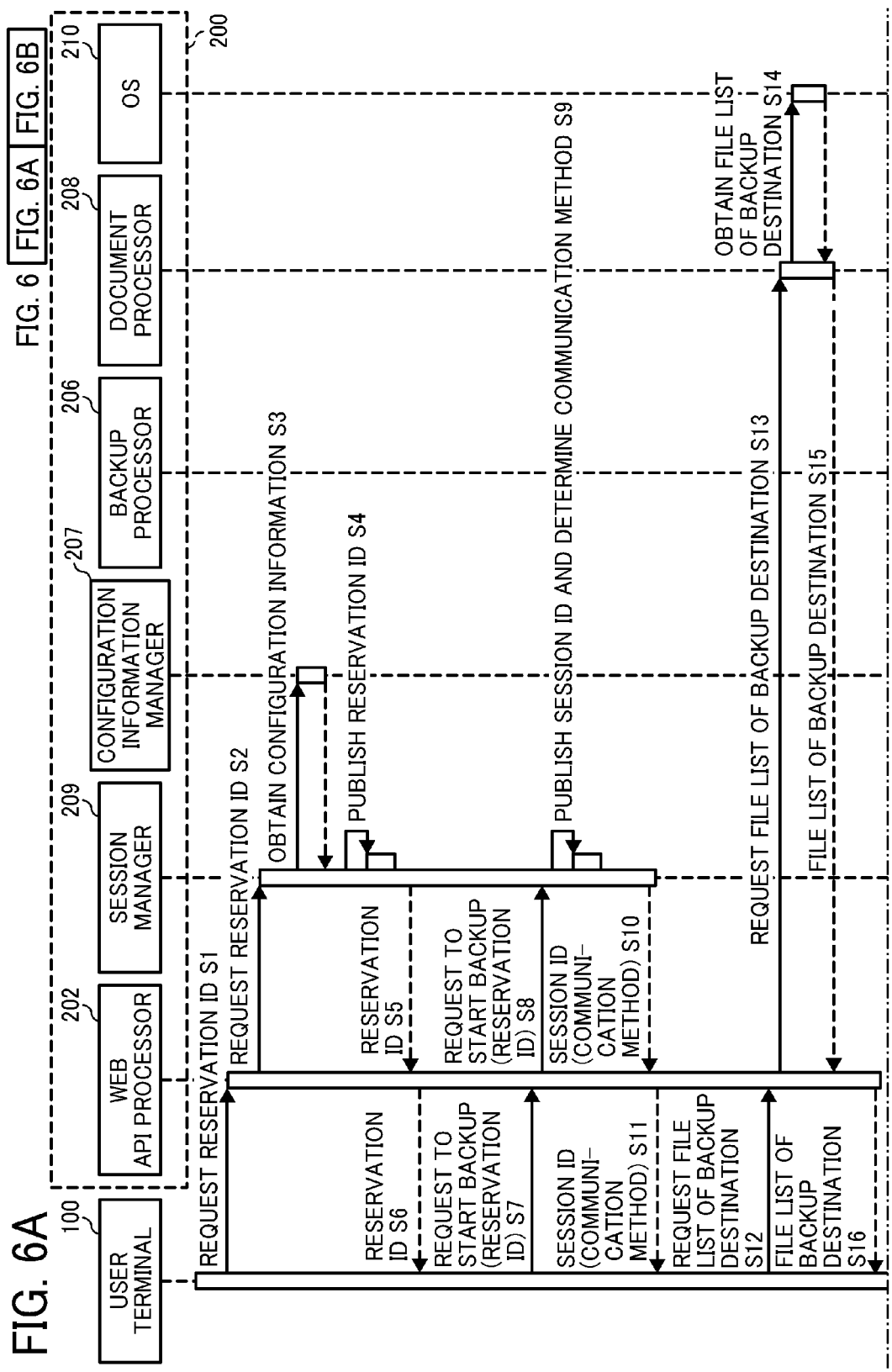

FIG. 7A

| | TERMINAL_ID | SESSION_ID | START_TIME | ELAPSED_TIME |
|---|---|---|---|---|
| 1 | Computer_A | SID1 | 2015/01/02/00:50:00 | 00:30:00 |
| 2 | Computer_B | SID2 | 2015/01/02/01:00:00 | 00:20:00 |
| 3 | Computer_C | SID3 | 2015/01/02/01:10:00 | 00:10:00 |
| 4 | Computer_D | SID4 | 2015/01/02/01:10:00 | 00:10:00 |
| 5 | Computer_E | SID5 | 2015/01/02/01:15:00 | 00:05:00 |

FIG. 7B

| | TERMINAL_ID | BACKUP REGULARLY | BACKUP SCHEDULE | PREVIOUS RESULT OF BACKUP | PREVIOUS BACKUP START TIME | PREVIOUS PROCESSING TIME |
|---|---|---|---|---|---|---|
| 1 | Computer_A | VALID | EVERY DAY 00:50:00 | SUCCEEDED | 2015/01/01/00:50:00 | 00:30:00 |
| 2 | Computer_B | VALID | EVERY DAY 01:00:00 | SUCCEEDED | 2015/01/01/01:00:00 | 00:20:00 |
| 3 | Computer_C | VALID | EVERY DAY 01:20:00 | SUCCEEDED | 2015/01/01/01:10:00 | 00:10:00 |
| ... | ... | ... | ... | ... | ... | ... |
| 8 | Computer_H | VALID | EVERY DAY 01:40:00 | FAILED | 2015/01/01/01:30:00 | – |
| ... | ... | ... | ... | ... | ... | ... |
| 49 | Computer_Y | INVALID | – | – | – | – |
| 50 | Computer_Z | INVALID | – | – | – | – |

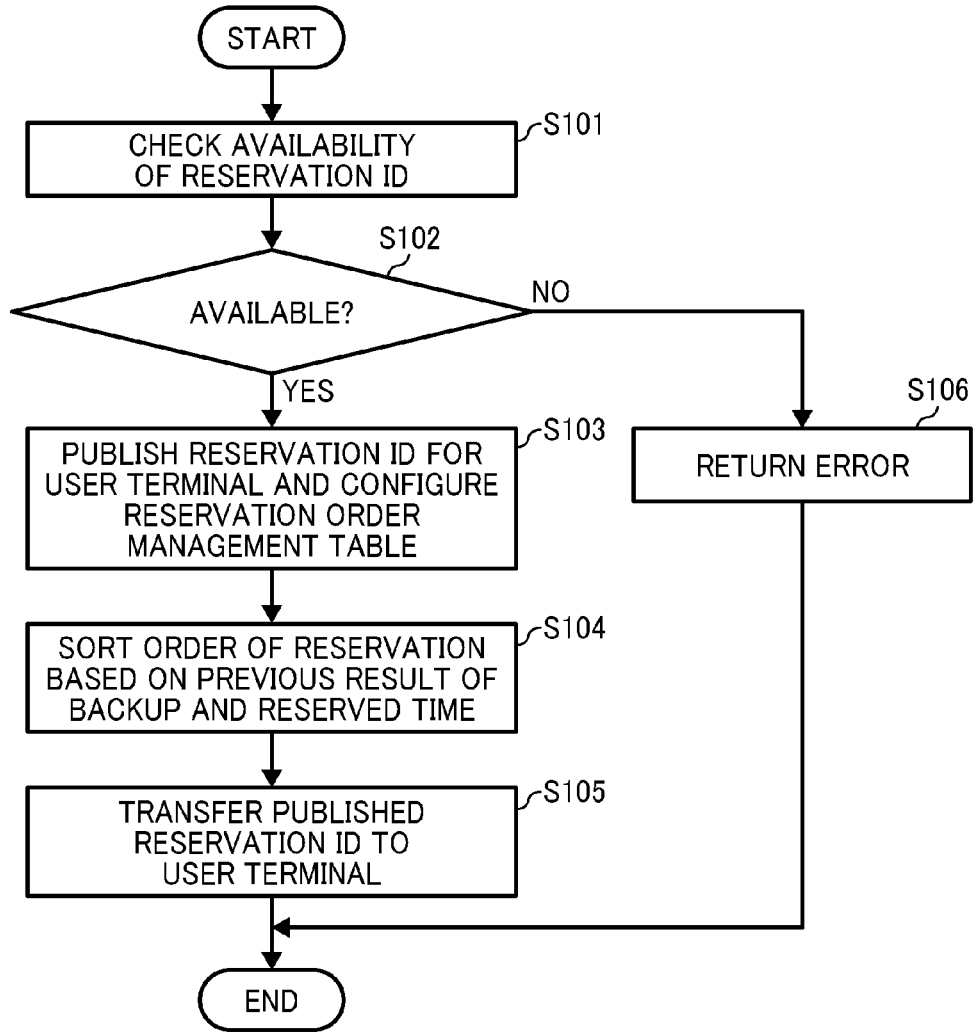

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Applications No. 2015-095373, filed on May 8, 2015 and No. 2016-085675, filed on Apr. 22, 2016 in the Japan Patent Office, the entire disclosures of which are hereby incorporated by reference herein.

BACKGROUND

Technical Field

The present invention relates to an information processing apparatus, an information processing system, and an information processing method.

Background Art

Recently, it becomes popular that a file server is connected to multiple personal computers (PCs) via a network and the multiple PCs share the connected file server as an external storage device.

In case that the PCs use such file server as a data backup, if backup processes are concurrently performed by multiple PCs, sessions in the file server are occupied by the backup processes for a long period of time, and other users cannot use the file server during that period of time.

SUMMARY

An example embodiment of the present invention provides a novel information processing apparatus that includes a receiver that receives a request for starting backup of data stored in an information processing terminal, from the information processing terminal through a network, and circuitry that allocates a session for backing up data to the information processing terminal based on a number of sessions each performing backup using a file-sharing communication protocol.

Further embodiments of the present invention provide an information processing system and an information processing method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 1 is a diagram illustrating a network configuration of an information processing system as an embodiment of the present invention.

FIG. 2 is a diagram illustrating functional blocks of apparatuses included in the information processing system as an embodiment of the present invention.

FIG. 3 is a sequence diagram illustrating operation of configuring a backup process as an embodiment of the present invention.

FIG. 4 is a diagram illustrating a backup configuration screen as an embodiment of the present invention.

FIGS. 5A and 5B are sequence diagrams illustrating an operation performed by a user terminal during the backup process as an embodiment of the present invention.

FIGS. 6A and 6B are sequence diagrams illustrating an operation performed by a file server during the backup process as an embodiment of the present invention.

FIGS. 7A, 7B, and 7C are diagrams illustrating a table managed by a session manager as an embodiment of the present invention.

FIG. 8 is a flowchart illustrating an operation of publishing a reservation ID as an embodiment of the present invention.

DETAILED DESCRIPTION

Figure 5B:
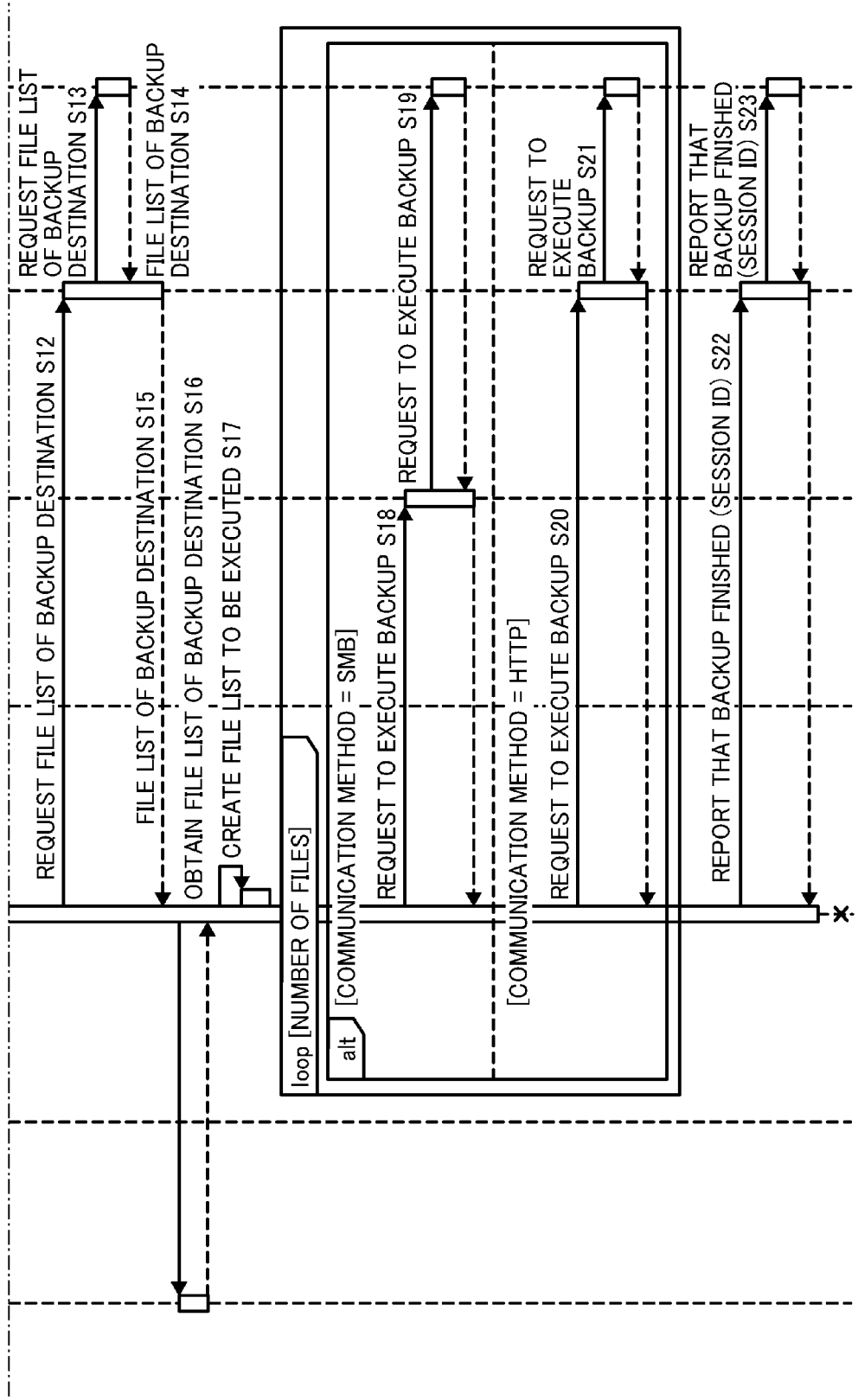

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the figures that are referred to below, the same symbols are used for the same elements and redundant descriptions are omitted.

In the embodiments shown below, a novel information processing apparatus that reduces a possibility that a session is occupied by backing up data is provided.

First Embodiment

FIG. 1 is a diagram illustrating a network configuration of an information processing system 1000 in this embodiment. The information processing system 1000 includes multiple user terminals 100 and an information processing apparatus 200.

The user terminal 100 is an information processing terminal referred to as a personal computer (PC). Examples of the user terminal 100 are a desktop PC, a notebook PC, a tablet PC, and a smartphone etc.

The information processing apparatus 200 is a computer that functions as a file server. In this embodiment, the multiple user terminals 100 share the information processing apparatus 200 connected via the network as the external storage device, and the information processing apparatus 200 is configured as a backup destination of data stored in a local storage device in each of the user terminals 100. It should be noted that the information processing apparatus 200 is expediently referred to as a file server 200 in the descriptions shown below.

In this embodiment, the file server 200 and the user terminals 100 (100*a*, 100*b*, and 100*c* etc.) are communicably connected with each other via a LAN 10 referred to as a Local Area Network (LAN).

Furthermore, in this embodiment, the file server 200 and an input/output apparatus are communicably connected with each other via a LAN 60. In response to specifying a file to be stored in the file server 200, and transferring a request to output the specified file to the input/output apparatus 40 as an output destination from the user terminals 100 (100*a*, 100*b*, and 100*c* etc.) to the file server 200, the file server 200 outputs the specified file from the specified input/output apparatus 40. Examples of the input/output apparatus 40 are electronic apparatuses such as a multifunction peripheral (MFP), a projector, and an electronic whiteboard.

The network configuration of the information processing system 1000 in this embodiment is described above. Next, a functional configuration of each apparatus included in the information processing system 1000 is described below with reference to FIG. 2.

The user terminal 100 in this embodiment includes an operating system (OS) 108, a GUI processor 102, a web API processor 103, a SMB processor 104, a backup processor 105, a configuration information manager 106, a regular executor 107, and a data storage area 109. The functional units described above are implemented by installing a dedicated application (hereinafter referred to as "terminal application") in the user terminal 100. The functional units and the OS 108 described above exchange requests and data with each other via a common framework used by software to communicate with each other.

The OS 108 is a generic operating system for clients. An example of the client OS is Windows 8.

The GUI processor 102 is a functional unit that controls user interfaces of the terminal application. For example, the GUI processor 102 displays a list of files stored in the data storage area 109. It is possible to select a desired file from the displayed file list to download the file and output the selected file using the input/output apparatus 40 by user operation. In addition, the GUI processor 102 displays screens such as a screen that displays a backup status and a screen that configures settings for backup etc.

The web API processor 103 is a functional unit that establishes communication using HTTP protocol (hereinafter referred to as HTTP communication) with the file server 200 to exchange data with the file server 200.

The SMB processor 104 is a functional unit that establishes communication using a file-sharing protocol with the file server 200 to exchange files with the file server 200. In this embodiment, Server Message Block (SMB) protocol is used as the file-sharing protocol. In the description below, communication using SMB protocol is referred to as SMB communication. It should be noted that file-sharing protocols other than SMB can be used in other embodiments The backup processor 105 is a functional unit that backs up data (file) specified by user operation.

The regular executor 107 is a functional unit that requests the backup processor 105 to start the backup at date and time configured by user operation. If it is impossible to back up due to unexpected reasons (e.g., shutdown of a power source) at date and time configured by user operation, the regular executor 107 can display a notification telling the accident using a pop-up dialog or reexecute the backup etc. when the user terminal 100 starts up.

The configuration information manager 106 is a functional unit that stores user information and various configuration information in the data storage area 109 to manage the data. In this case, an example of the user information is account information used in logging in the file server 200 by user operation. In addition, an example of the configuration information in this case is a condition of the backup (hereinafter referred to as a backup condition). Examples of the backup condition are a schedule of the backup, a backup method, a communication method in the backup, and a file to be backed up.

The functional configuration of the user terminal 100 is described above. In this embodiment, the backup processor 105 and the SMB processor 104 correspond to a first backup unit that backs up data by communication using the file-sharing protocol (e.g., SMB protocol), and the backup processor 105 and the web API processor 103 correspond to a second backup unit that backs up data by communication using HTTP protocol.

Next, functional blocks of the file server 200 in this embodiment are described below.

The file server 200 in this embodiment includes an OS 210, a web API processor 202, a web UI processor 203, a device registration processor 204, an input/output processor 205, a backup processor 206, a configuration information manager 207, a document processor 208, a session manager 209, and a data storage area 211. The functional units described above are implemented by installing a dedicated application (hereinafter referred to as "server application") in the file server 200. The functional units and the OS 210 described above exchange requests and data with each other via a common framework used by software to communicate with each other.

The OS 210 is a generic operating system for clients. An example of the client OS is Windows 8. In the OS 210, an upper limit of the number of allowable sessions (hereinafter referred to as allowable number of sessions) is configured. For example, the upper limit of the number of allowable sessions can be configured by user operation according to the user preference. If the number of sessions reaches the upper limit, a new access by user operation becomes an error.

The web API processor 202 is a functional unit that establishes HTTP communication with the user terminal 100 to exchange data.

The web UI processor 203 is a functional unit that functions as a web server. The web UI processor 203 displays various information that the file server 200 stores (e.g., amount of data stored for each user etc.) on a browser of the user terminal 100.

The backup processor 206 is a functional unit that backs up in response to a request for backup sent from the user terminal 100.

The document processor 208 is a functional unit that manages files stored in the data storage area 211. In preferred embodiments, in storing the file uploaded from the user terminal 100 in the data storage area 211, the document processor 208 converts the file into image data in a general-purpose format (e.g., JPEG, TIFF, and PDF etc.) used for terminals not compatible with the file format of the uploaded file and stores the converted file along with the original file.

The configuration information manager 207 is a functional unit that stores user information and system information in the data storage area 211 to manage the data. In this case, an example of the user information described above is a user name, password, access authority, workflow setting, and various setting values of the web UI screen. In addition, an example of the system information described above is apparatus specific information of the user terminal 100.

The device registration processor 204 is a functional unit that registers the user terminal 100 that uses the file server 200 by user operation. The device registration processor 204 transfers a file that stores information required for registering the device to the user terminal 100 when the user terminal 100 is registered. The user terminal 100 establishes communication with the file server 200 based on the information in the transferred file.

The input/output processor 205 is a functional unit that exchanges data with the input/output apparatus 40.

The session manager 209 is a functional unit that manages a session of SMB communication used for the backup. As described above, in the assumption that the allowable number of sessions is configured in the OS 210, it is required to prevent the limited sessions from being occupied excessively by backing up data and evenly finish backup processes for all user terminals 100. With consideration to the requisite, it is impossible to allocate sessions of SMB communication that occupies the session for a long period of time (around 10 to 20 minutes) once the session is established for backing up data limitlessly.

To cope with this issue, in this embodiment, the upper limit of the number of sessions of SMB communication allowed to be allocated for the backup (hereinafter referred to as the number of sessions allowed for backup) is configured. For example, if the allowable number of sessions configured in the OS 210 is "20", the number of sessions allowed for backup is set to "5".

After that, if the number of sessions executing backup using SMB communication does not reach the number of sessions allowed for backup at the time when the user terminal 100 requests to back up, the session manager 209 allocates a session of SMB communication for the backup. Otherwise, if the number of sessions executing backup using SMB communication reaches the number of sessions allowed for backup at the time when the user terminal 100 requests to back up, the session manager 209 allocates a session using HTTP communication for the backup. Generally, HTTP protocol has larger overhead compared to SMB protocol. However, since occupied time of sessions using HTTP communication is shorter than occupied time of sessions using SMB communication, it is possible to prevent the bandwidth of the file server 200 from being occupied by the backup processes excessively.

The functional configuration of the apparatuses included in the information processing system 1000 is described above. Next, specific operations executed by the functional units described above are described below. In the below description, it should be noted that FIG. 2 is referred to arbitrarily.

First, an operation performed by the user terminal 100 in configuring the backup condition is described below with reference to the sequence chart in FIG. 3.

After displaying the configuration screen by user operation in S1, the GUI processor 102 reads configuration values stored in the data storage area 109 via the configuration information manager 106 in S2 to display a backup configuration screen reflecting the configuration values.

FIG. 4 is a diagram illustrating a backup configuration screen 50 for an example. In FIG. 4, the backup configuration screen 50 includes a check box 52 for selecting enabling or disabling a regular backup, a configuration area 53 for setting a schedule of the regular backup, a configuration area 54 for setting a backup method, a configuration area 56 for setting a communication method in the backup, and a configuration area 58 for setting a condition regarding retrying (hereinafter referred to as retry condition).

In case of enabling to back up regularly at specified date and time by user operation, it is enabled to back up regularly by checking the check box 52, setting time when the backup is performed in the configuration area 53, and selecting date when the backup is performed using the radio button. For example, it is possible to configure date and time when the regular backup is performed circumventing a time zone when input operations to the input/output apparatuses 40 (e.g., the MFP and the projector etc.) via the file server 200 and output operations from the input/output apparatuses 40 are frequently performed (e.g., during business hours).

In addition, regarding the backup method, either "mirroring method" or "overwriting method" is selected using the radio button in the configuration area 54. In this case, the overwriting method indicates a method that a file added or updated in the user terminal 100 is copied to the file server 200. On the other hand, the mirroring method indicates a method that a file added or updated in the user terminal 100 is copied to the file server 200. In addition, in the mirroring method, if a file is deleted in the user terminal 100, the corresponding file in the file server 200 is also deleted from the file server 200.

In addition, regarding the communication method, either "SMB or HTTP" or "SMB only" is selected using the radio button in the configuration area 56. If "SMB only" is selected, the backup is performed using SMB communication only. By contrast, if "SMB or HTTP" is selected, the communication method in the backup is dynamically determined as either SMB communication or HTTP communication.

In addition, in case of retrying if it is impossible to connect to the file server 200 at the set time by user operation, the corresponding check box in the configuration area 58 is checked and maximum time to perform the retry is set. In addition, if it is impossible to back up due to unexpected reasons (e.g., shutdown of a power source) at date and time configured by user operation, the corresponding check box is checked if it is desired to reexecute the backup as soon as getting ready.

Now, the description continues with reference to FIG. 3. After inputting the configuration values via the backup configuration screen 50 and finishing configuring the backup condition specifying a file to be backed up via another configuration screen by user operation in S3, the GUI processor 102 stores the input configuration values in the data storage area 109 via the configuration information manager 106 in S4. In this case, if the configuration values regarding the schedule of the regular backup (i.e., execution date and time) is updated, the configuration information manager 106 registers the updated configuration values (i.e., execution date and time) in the regular executor 107 in S5. In response, the regular executor 107 registers a task schedule (i.e., execution date and time) in a task scheduler in the OS 108 of the user terminal 100 in S6.

In addition, the configuration information manager 106 generates a request to update including the configuration values stored in S4 and transfer the generated request to update to the web API processor 103 in S7. In response, the web API processor 103 transfers the request to update to the file server 200 using HTTP communication in S8.

After configuring the backup condition as described above, the OS 108 transfers an execution trigger to the regular executor 107 in S9 each time the schedule registered in S6 (i.e., execution date and time) arrives. The regular executor 107 starts the backup process in response to the execution trigger transferred by the OS 108. After finishing the backup process, the regular executor 107 reports the processing result to the file server 200 in S10.

The operation performed by the user terminal 100 in configuring the backup condition is described above. Next, an operation performed by the user terminal 100 in the backup operation is described below with reference to a sequence charts shown in FIGS. 5A and 5B.

After a task scheduler of the OS 108 transfers a trigger for execution in S1, the regular executor 107 requests the backup processor 105 to perform the backup in S2. After receiving the request, the backup processor 105 reads backup conditions configured by user operation (a file to be backed up, a backup method, a communication method in the backup, and a retry condition etc.) from the data storage area 109 via the configuration information manager 106 in S3.

Next, the backup processor 105 generates a request for reservation ID including individual identification information (hereinafter referred to as a terminal ID) and passes the generated request for the reservation ID to the web API processor 103 in S4. In response, the web API processor 103 transfers the request for reservation ID to the file server 200 using HTTP communication in S5. If the file server 200 returns the reservation ID in response to the transferred request for reservation ID in S6, the web API processor 103 receives the reservation ID and passes the reservation ID to the backup processor 105 in S7.

Here, in this embodiment, since an upper limit for the number of published reservation IDs (described in detail later), if the number of published reservation IDs reaches the upper limit at the time of transferring the request for reservation ID, the request for reservation ID transferred in S5 becomes an error. In this case, the backup processor 105 determines whether or not the retry condition read in S3 indicates that the retry is performed. As a result, if it is determined that the retry is performed, the backup processor 105 repeats transferring the request for reservation ID at a predetermined interval (e.g., one hour) until the reservation ID is acquired. After that, if the reservation ID cannot be acquired even after the maximum period of time (e.g., three hours) configured in the retry condition expires, the backup processor 105 stops transferring the request for reservation ID.

As described above, after acquiring the reservation ID, the backup processor 105 generates a request to start backup including the acquired reservation ID and passes the generated request to start backup to the web API processor 103 in S8. In response, the web API processor 103 transfers the request to start backup to the file server 200 using HTTP communication in S9. If the file server 200 returns the session ID and information specifying the communication method (i.e., SMB communication or HTTP communication) in response to the transferred request to start backup in S10, the web API processor 103 receives the session ID and the communication method to pass the session ID and the communication method to the backup processor 105 in S11.

Here, if the number of allowable sessions configured in the OS 210 of the file server 200 (e.g., 20) is all run out at the time when the request to start backup is transferred, the request to start backup transferred in S9 becomes an error. In this case, the backup processor 105 repeats transferring the request to start backup at a predetermined time interval (e.g., one minute) via the web API processor 103 until the session ID can be acquired.

As described above, after acquiring the session ID, the backup processor 105 generates a request for backup destination file list including the terminal ID of the user terminal 100 and passes the generated request for backup destination file list up to the web API processor 103 in S12. In response, the web API processor 103 transfers the request for backup destination file list to the file server 200 using HTTP communication in S12. If the file server 200 returns the backup destination file list in response to the transferred request for file list to be backed up in S14, the web API processor 103 receives the backup destination file list and passes the received backup destination file list to the backup processor 105 in S15. Here, the backup destination file list indicates a list of files that the user terminal 100 specifies to be backed up among files stored in the file server 200.

Next, the backup processor 105 acquires a list of files to be backed up read in S3 (hereinafter referred to as a backup source file list) from a file system of the OS 108 in S16. Subsequently, the backup processor 105 creates an execution file list based on the backup destination file list acquired from the file server 200 and the backup source file list acquired from the file system of the OS 108 in S17.

More specifically, if the backup method read in S3 indicates the overwriting method, the backup processor 105 creates a file list that added or updated files are to be copied among the files described in the backup source file list as the execution file list. By contrast, if the backup method read in S3 indicates the mirroring method, the backup processor 105 creates a file list that added or updated files are to be copied among the files described in the backup source file list and deletion files in the user terminal 100 detected by comparing the backup destination file list with the backup source file list are to be to be deleted as an execution file list.

Next, the backup processor 105 establishes a session with the file server 200 using the session ID acquired in S11. More specifically, if the communication method specified in the information acquired in S11 is SMB communication, the session of SMB communication is established with the file server 200. If the communication method specified in the information acquired in S11 is HTTP communication, the session of HTTP communication is established with the file server 200. Subsequently, the backup processor 105 performs the backup process using the established session.

If the communication method specified in the information acquired in S11 is SMB communication, the backup processor 105 generates a request to perform backup that requests to copy or delete files listed in the execution file list created in S17 and passes the generated request to perform backup to the SMB processor 104 in S18. In response, the SMB processor 104 transfers the request to perform backup to the file server 200 using SMB communication in S19. Subsequently, S18 and S19 are repeated for all files listed in the execution file list.

By contrast, if the communication method specified in the information acquired in S11 is HTTP communication, the backup processor 105 generates a request to perform backup that requests to copy or delete files listed in the execution file list created in S17 and passes the generated request to perform backup to the web API processor 103 in S20. In response, the web API processor 103 transfers the request to perform backup to the file server 200 using HTTP communication in S21. Subsequently, S20 and S21 are repeated for all files listed in the execution file list.

The backup processor 105 transfers the request to perform backup regarding all files listed in the execution file list to the file server 200 and receives the processing result. Subsequently, the backup processor 105 generates a backup completion notification including the session ID of the session used for the backup and the result of the backup process (succeeded or failed) and passes the generated backup completion notification to the web API processor 103 in S22. In response, the web API processor 103 transfers the backup completion notification to the file server 200 using HTTP communication in S23.

If the backup processor 105 cannot perform backup because of failing to acquire the reservation ID described above, the backup processor 105 generates a backup completion notification including the terminal ID and the result of backup (failed) and passes the generated backup completion notification to the web API processor 103 in S22. In response, the web API processor 103 transfers the backup completion notification to the file server 200 using HTTP communication in S23.

The operation performed by the user terminal 100 in the backup operation is described above. Next, the operation performed by the file server 200 in the backup operation is described below with reference to sequence charts in FIGS. 6A and 6B.

After receiving the request for reservation ID from the user terminal 100 in S1, the web API processor 202 passes the received request for reservation ID to the session manager 209 in S2. In response, the session manager 209 acquires a backup condition associated with the terminal ID included in the received request for reservation ID from the data storage area 211 via the configuration information manager 207 in S3. Subsequently, the session manager 209 publishes the reservation ID in S4. The operation that publishes the reservation ID is described later in detail.

After that, the session manager 209 passes the published reservation ID to the web API processor 202 in S5. In response, the web API processor 202 transfers the reservation ID to the user terminal 100 using HTTP communication in S6.

After receiving the request to start backup from the user terminal 100 in S7, the web API processor 202 passes the received request to start backup to the session manager 209 in S8. In response, the session manager 209 publishes the session ID based on the reservation ID included in the received request to start backup and determines the communication method for the backup as either SMB communication or HTTP communication in S9. The operation performed in S9 is described later in detail.

After that, the session manager 209 passes the published session ID and information specifying the determined communication method (i.e., SMB communication or HTTP communication) to the web API processor 202 in S10. In response, the web API processor 202 transfers the session ID and the information specifying the communication method (hereinafter referred to as communication method simply in some cases) using HTTP communication in S11.

After receiving the request for backup destination file list from the user terminal 100 in S12, the web API processor 202 passes the received request for file list to the document processor 208 in S13. In response, the document processor 208 acquires the backup source file list from the file system of the OS 210 in S14 and passes the acquired backup source file list to the web API processor 202 in S15. In response, the web API processor 202 transfers the backup source file list to the user terminal 100 using HTTP communication in S16.

After that, the user terminal 100 transfers the request to perform backup to the file server 200 using either SMB communication or HTTP communication specified by the file server 200.

The request to perform backup transferred by the user terminal 100 using SMB communication is received in the file system of the OS 210 in the file server 200. After performing the operation (copying or deleting files) specified in the received request to perform backup, the file system of the OS 210 returns the processing result to the user terminal 100 using SMB communication.

By contrast, the request to perform backup transferred by the user terminal 100 using HTTP communication is received by the web API processor 202 in S18. The web API processor 202 passes the received request to perform backup to the backup processor 206 in S19. In response, the backup processor 206 passes the request to perform backup to the file system of the OS 210 in S20. After performing the operation (copying or deleting files) specified in the received request to perform backup, the file system of the OS 210 returns the processing result to the backup processor 206. The backup processor 206 passes the received processing result to the web API processor 202, and the web API processor 202 transfers the received processing result to the user terminal 100 using HTTP communication.

After that, after receiving the backup completion notification from the user terminal 100 in S21, the web API processor 202 passes the received backup completion notification to the session manager 209 in S22, In response, the session manager 209 commands the OS 210 to discard the session regarding the session ID included in the backup completion notification in S23. In response, the OS 210 discards the session regarding the session ID. As a result, even if a session retention period of SMB protocol configured in the OS 210 is remaining, SMB communication is cut off forcibly, and the session is quickly released.

If the OS 210 discards the session of SMB communication, the session manager 209 updates a SMB communication session management table (described later) in S24 and stores a result (succeeded or failed) of the backup process included in the backup completion notification in a backup result management table (described later) in S25.

The operation performed by the file server 200 in the backup process is described above. Next, a table that the session manager 209 in the file server 200 manages is described below.

In this embodiment, the session manager 209 manages a SMB communication session management table 500 in FIG. 7A, a backup result management table 600 in FIG. 7B, and a reservation order management table 700 in FIG. 7C

The SMB communication session management table 500 in FIG. 7A is a table that manages sessions of the user terminal 100 that specifies SMB communication as the communication method in the backup. The SMB communication session management table 500 includes the same number of records as the upper limit number of sessions by SMB communication (hereinafter referred to as SMB communication session) allowed to be allocated for backup (i.e., the number of allowable sessions for backup). In FIG. 7A, the SMB communication session management table 500 includes five records. Each record includes a field 501 that stores the terminal ID of the user terminal 100, a field 502 that stores the session ID of the SMB communication session allocated to the user terminal 100, a field 503 that stores start time of the backup using the SMB communication session, and a field 504 that stores elapsed time since the backup starts.

In publishing the session ID to the user terminal 100 that specifying SMB communication as the communication method, the session manager 209 stores the terminal ID of the user terminal 100 in the field 501, the published session ID in the field 502, the start time of the backup in the field 503, and the elapsed time in the field 504 in the SMB communication session management table 500 respectively.

Figure 6B:
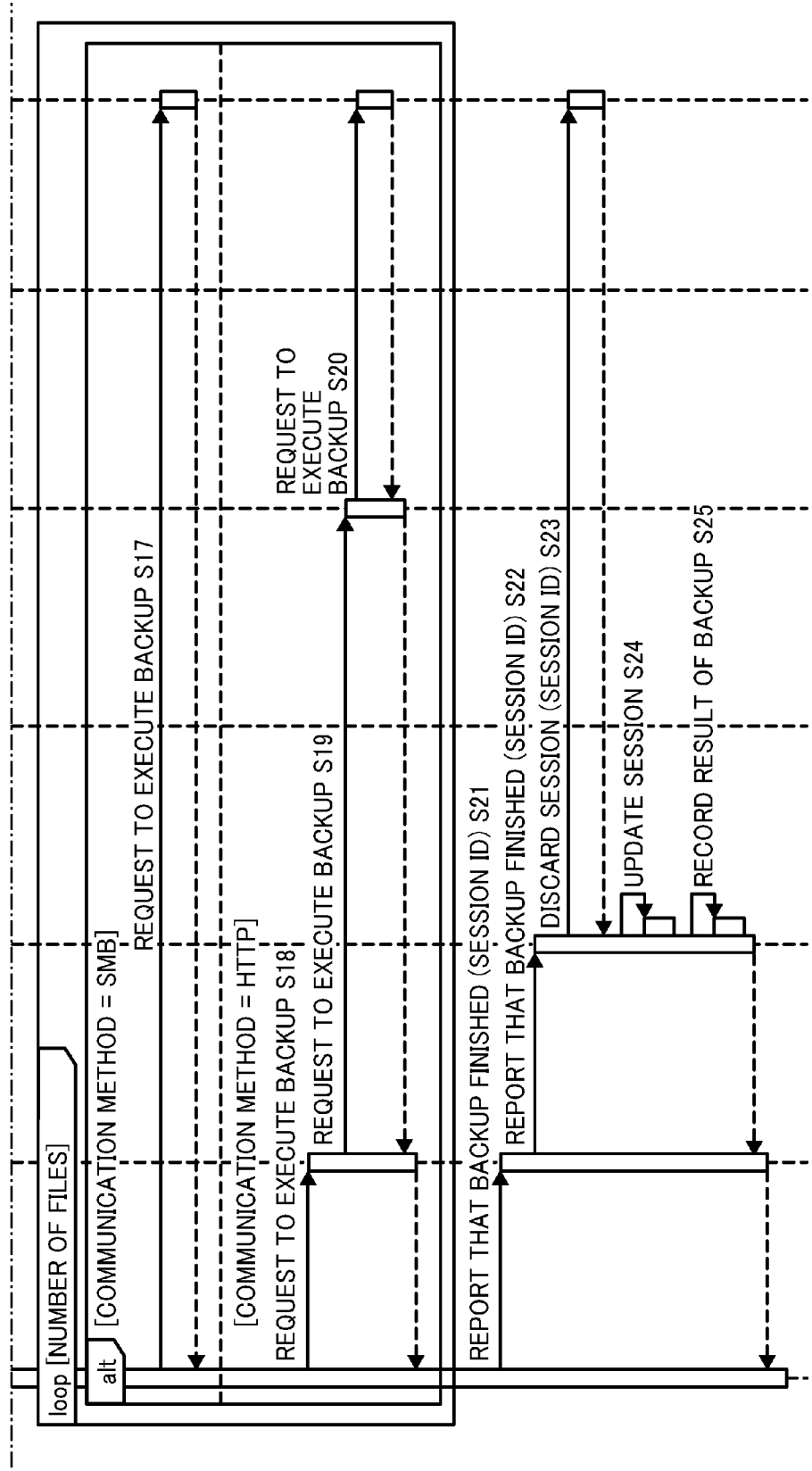

In addition, in case of discarding the SMB communication session allocated to the backup in S23 in FIG. 6, the session manager 209 clears a value of the record that stores the session ID of the discarded session in field 502 in S24 in FIG. 6B.

The backup result management table 600 in FIG. 7B is a table that manages results of the backup operation for the user terminal 100. Each record in the backup result management table 600 includes a field 601 that stores the terminal ID of the user terminal 100 registered to use the file server 200, a field 602 that stores a configuration of a regular backup configured by the user terminal 100, a field 603 that stores an execution schedule configured by the user terminal 100, a field 604 that stores a result of the backup performed by the user terminal 100 last time (hereinafter referred to as previous backup result), a field 605 that stores the start time of the backup performed by the user terminal 100 last time, and a filed 606 that stores time elapsed for the backup performed by the user terminal 100 last time (hereinafter referred to as previous backup time).

In response to receiving the backup completion notification in S22 in FIG. 6B, the session manager 209 specifies a record whose field 601 stores the terminal ID associated with the session ID included in the backup completion notification and stores the result of the backup included in the backup completion notification (succeeded or failed) in the field 604 in the specified record, the start time of the backup regarding the backup completion notification in the field 605 in the specified record, and the time spent for the backup regarding the backup completion notification in the filed 606 in the specified record respectively.

The reservation order management table 700 in FIG. 7C is a table for managing a waiting order of the user terminal 100 that published the reservation ID. As described above, in this embodiment, the upper limit of the number of published reservation IDs (hereinafter referred to as an allowable number of published reservation IDs) is configured, and the reservation order management table 700 includes the same number of records as the allowed number of published reservation IDs. In FIG. 7C, five records are included, and each record includes a field 701 that stores the terminal ID of the user terminal 100, a field 702 that stores the published reservation ID, a field 703 that stores reservation time, and a field 704 that stores a result of the backup performed by the user terminal 100 that published the reservation ID last time (succeeded or failed).

In this embodiment, sequence of records in the reservation order management table 700 corresponds to the waiting order of the user terminal 100, and the session ID is published to the user terminal 100 stored in the upper record sequentially.

In publishing the reservation ID in S4 in FIG. 6, the session manager 209 stores the terminal ID of the destination user terminal 100 in the field 701, the published reservation ID in the field 702, time when the reservation ID was published in the field 703, and the previous backup result regarding the user terminal 100 in the field 704. In addition, in case of publishing the session ID to the user terminal 100, the session manager 209 clears a value of a record that stores the terminal ID of the user terminal 100 that the session ID was published.

As described above, the table that the session manager 209 manages is described above. Next, an operation of publishing the reservation ID performed by the session manager 209 in S4 and S5 in FIG. 6 is described below.

In response to receiving the request for reservation ID from the user terminal 100, the session manager 209 starts the operation of publishing reservation ID illustrated in the flowchart in FIG. 8. In the below description, it should be noted that FIGS. 7A, 7B, and 7C are referred to arbitrarily.

In S101, availability of the reservation is checked. More specifically, it is determined whether or not there is an available record in the reservation order management table 700. As a result, if there is no available record (i.e., the number of published reservation IDs reaches the allowable number of published reservation IDs at that time), it is determined that no reservation ID is available (NO in S102), an error to returned to the user terminal 100 in S106, and the operation ends. By contrast, if there is an available record, it is determined that the reservation ID is available (YES in S102), and the step proceeds to S103.

In S103, the reservation ID is published and allocated to the user terminal 100 that transferred the request for reservation ID, and the content is set to the reservation order management table 700. More specifically, first, the terminal ID included in the request for reservation ID is set to the field 701 in the reservation order management table 700, the published reservation ID is set to the field 702 in the reservation order management table 700, and time when the reservation ID is published is set to the field 703 in the reservation order management table 700 respectively. Subsequently, the previous backup result (the value in the field 604) associated with the terminal ID included in the request for reservation ID is read from the backup result management table 600, and the read previous backup result is set to the field 704 in the reservation order management table 700.

Next, in S104, the reservation order is sorted out based on the result of backup performed by the user terminal 100 that the reservation ID is published last time and the reservation time. More specifically, records in the reservation order management table 700 are sorted out so that a record that stores "failed" in the previous backup result (i.e., the value of the field 704) becomes upper than a record that stores "succeeded" and a record that stores earlier time in the reservation time (i.e., the value of the field 703) becomes upper.

Lastly, the reservation ID published in S103 is transferred to the user terminal 100 that transferred the request for reservation ID in S105, and the operation ends.

The operation of publishing reservation ID performed by the session manager 209 is described above. Next, an operation of publishing session ID performed by the session manager 209 in S9 and S10 in FIG. 6 is described below. In the below description, it should be noted that FIGS. 7A, 7B, and 7C are referred to arbitrarily.

Figure 9:
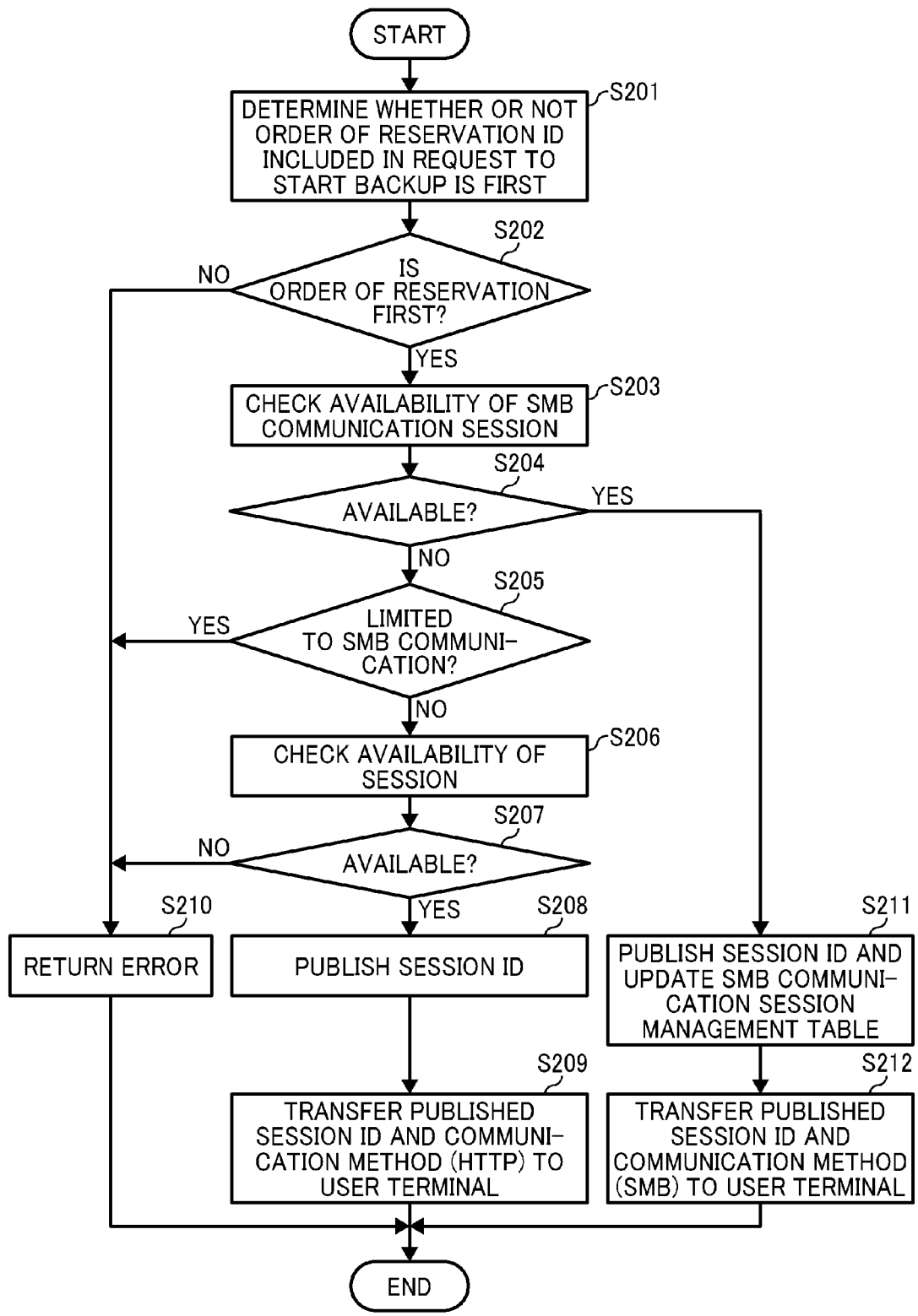
FIG. 9 is a flowchart illustrating an operation of publishing a session ID as an embodiment of the present invention.

In response to receiving the request for reservation ID from the user terminal 100, the session manager 209 starts the operation of publishing session ID illustrated in the flowchart in FIG. 9.

In S201, it is determined whether or not the waiting order of the reservation ID included in the request to start backup is first. More specifically, it is determined whether or not the reservation ID stored in the field 701 of the highest record in the reservation order management table 700 corresponds to the reservation ID included in the request to start backup. As a result, if it is determined that the reservation IDs does not match, it is determined that the waiting order is not first (NO in S202), an error is returned to the user terminal 100 that transferred the request for reservation ID in S210, and the operation ends. By contrast, if the reservation IDs matches, it is determined that the waiting order is first (YES in S202), and the step proceeds to S203.

In S203, availability of SMB communication sessions is checked. More specifically, it is determined whether or not there is an available record in the SMB communication session management table 500. As a result, if it is determined that there is an available record (i.e., the number of published session IDs does not reach the allowable number of sessions for backup at that time), it is determined that the session ID is available (YES in S204), and the step proceeds to S211.

In S211, the session ID is published and allocated to the user terminal 100 that transferred the request for reservation ID, and the content is set to the SMB communication session management table 500. More specifically, the terminal ID included in the request for reservation ID is set to the field 501 in the SMB communication session management table 500, and the published session ID is set to the field 502 in the SMB communication session management table 500 respectively.

In S212, the published session ID and the communication method (i.e., SMB communication) is transferred to the user terminal 100 that transferred the request for reservation ID, and the operation ends.

By contrast, if it is determined that there is no available SMB communication session (NO in S204), the communication method regarding the user terminal 100 is checked. As a result, if the communication method regarding the user terminal 100 is limited to SMB communication (YES in S205), an error is returned to the user terminal 100 that transferred the request for reservation ID in S210, and the operation ends. By contrast, if the communication method regarding the user terminal 100 is not limited to SMB communication (NO in S205), the step proceeds to S206.

In S206, availability of session IDs is checked in S207. More specifically, it is determined whether or not the current number of sessions in the file server 200 reaches the allowable number of sessions configured in the OS 210. As a result, if the current number of sessions reaches the allowable number of sessions, it is determined that there is no available session (NO in S207), an error is returned to the user terminal 100 that transferred the request for reservation ID in S210, and the operation ends. By contrast, if the current number of sessions does not reach the allowable number of sessions, it is determined that there is an available session (YES in S207), and the step proceeds to S208.

In S208, the session ID is published and allocated to the user terminal 100 that transferred the request for reservation ID, the published session ID and the communication method (HTTP communication) is transferred to the user terminal that transferred the request for reservation ID in S209, and the operation ends.

As described above, in this embodiment, since the number of sessions for SMB communication allocated for backup is limited, possibility that the bandwidth of the file server 200 is excessively occupied by backup of data can be reduced. In addition, in this embodiment, order of reservation for the user terminal 100 that failed to back up previously is sorted to upper level, and a session is allocated to the user terminal 100 preferentially. As a result, it is possible to ensure equal opportunities among users. In addition, in this embodiment, if sessions of SMB communication for backup are run out, backup processes using HTTP communication whose session occupancy is shorter than SMB communication are performed. As a result, it is possible to evenly finish backup processes for all user terminals 100.

The first embodiment of the present invention is described above. Next, a second embodiment of the present invention is described below. In this embodiment, descriptions for parts corresponding to the first embodiment are omitted arbitrarily, and points different from the first embodiment are mainly described.

Second Embodiment

Figure 10:
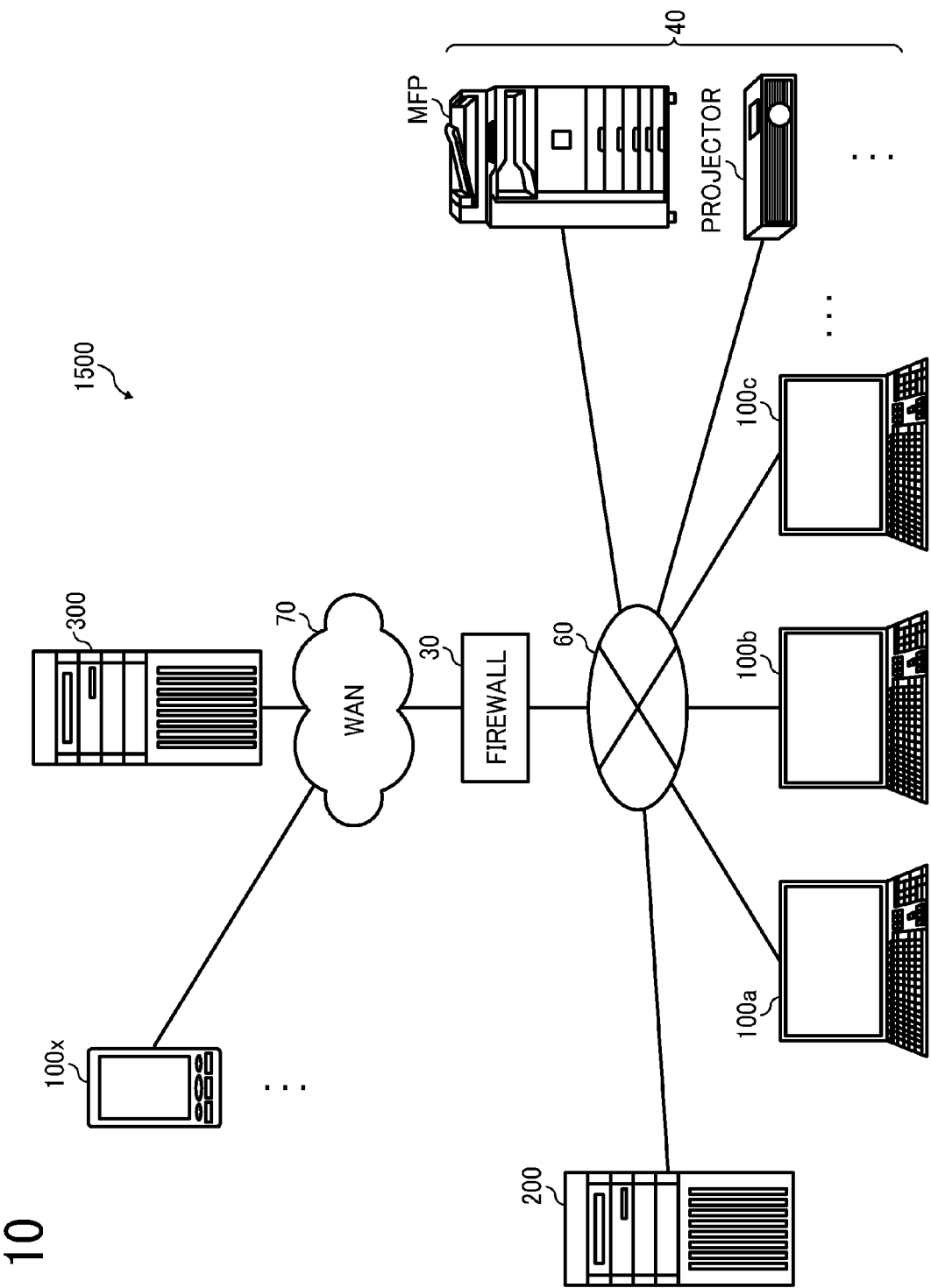
FIG. 10 is a diagram illustrating a network configuration of an information processing system as an embodiment of the present invention.

FIG. 10 is a diagram illustrating a network configuration of an information processing system 1500 in this embodiment. The information processing system 1500 includes multiple user terminal 100, an information processing apparatus 200 (hereinafter referred to as a file server 200), and a relay apparatus 300 (hereinafter referred to as a relay server 300). That is, the relay server 300 is added to the information processing system 1500 in this embodiment compared to the information processing system 1000 in FIG. 1.

Here, the relay server 300 is a computer apparatus that includes a capability of relaying data communication between the user terminal 100 and the file server 200, and the relay server 300 is connected to a WAN 70 referred to as a wide area network (e.g., Internet and VPN etc.).

Here, the WAN 70 and the LAN 60 are connected with each other via a firewall 30. Since the firewall 30 cuts off HTTP requests transferred from the WAN 70 to the LAN 60 to ensure confidentiality of the LAN 60, the user terminal 100 (e.g., a user terminal 100*x* shown as a smartphone) outside the LAN 60 cannot directly transfer a HTTP request to the file server 200 connected to the LAN 60 via the WAN 70.

To cope with this issue, in this embodiment, the relay server 300 stores a HTTP request received from the user terminal 100*x* outside the LAN 60 in a queue and transfers the HTTP request stored in the queue to the file server 200 in response to an inquiry from the file server 200. As a result, it is possible to deliver the HTTP request from the user terminal 100*x* outside the LAN 60 to the file server 200.

Similarly, the relay server 300 stores a HTTP request received from the user terminal 100 (i.e., 100*a*, 100*b*, and 100*c* etc.) connected to the LAN 60 in a queue and transfers the HTTP request stored in the queue to the file server 200 in response to an inquiry from the file server 200. As a result, it is possible to deliver the HTTP request from the user terminal 100 (i.e., 100*a*, 100*b*, and 100*c* etc.) connected to the LAN 60 to the file server 200.

Figure 11:
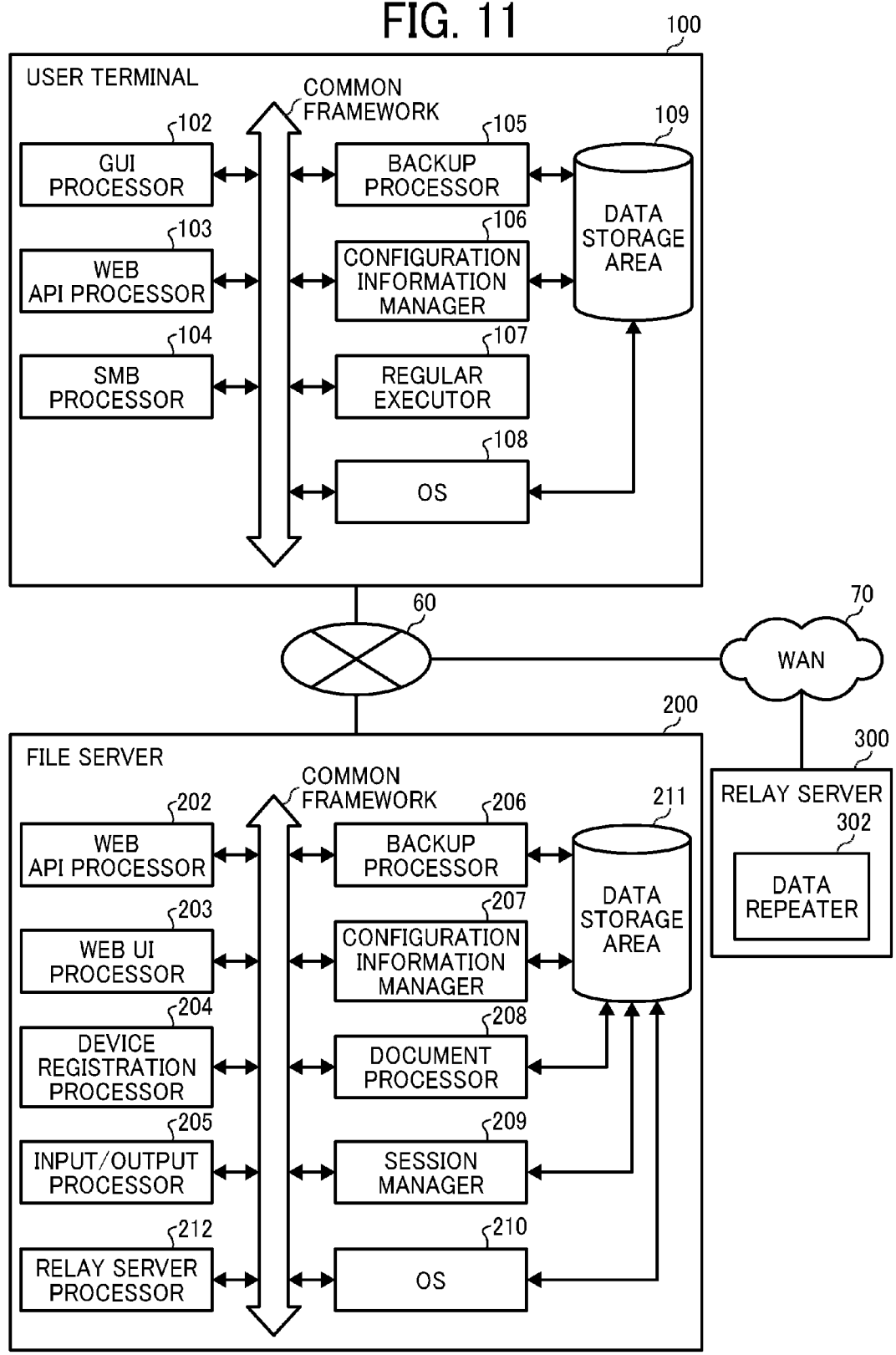
FIG. 11 is a diagram illustrating functional blocks of apparatuses included in the information processing system as an embodiment of the present invention.

The network configuration of the information processing system 1500 in this embodiment is described above. Next, a functional configuration of each apparatus included in the information processing system 1500 is described below with reference to FIG. 11 illustrating functional blocks.

Since the functional configuration of the user terminal 100 in this embodiment is the same as the functional configuration illustrated in FIG. 2, the description is omitted here.

In the file server 200 in this embodiment, a relay server processor 212 added to the configuration shown in FIG. 2.

Here, the relay server processor 212 regularly inquires of the relay server 300 using HTTP communication, obtains a HTTP request destined to itself from the relay server 300, passes the obtained HTTP request to other functional units to process the HTTP request, and transfers the processing result to the relay server 300 using HTTP communication.

In this embodiment, the relay server includes a data repeater 302.

The data repeater 302 is a functional unit that relays an exchange of data either with the user terminal 100 or with the file server 200 using HTTP communication. In this embodiment, the data repeater 302 includes queues corresponding to multiple user terminals 100 and the file server 200 respectively, and the data repeater 302 stores requests specifying each apparatus as a destination and data in the corresponding queue and, after receiving a request to obtain from each apparatus, obtains a request and data from the corresponding queue to transfer the obtained request and data to the source apparatus who issues the request.

The functional configuration of the apparatuses included in the information processing system 1500 is described above. Next, specific operations executed by the functional units described above are described below. It should be noted that only points different from the first embodiment are mainly described below.

Figure 12:
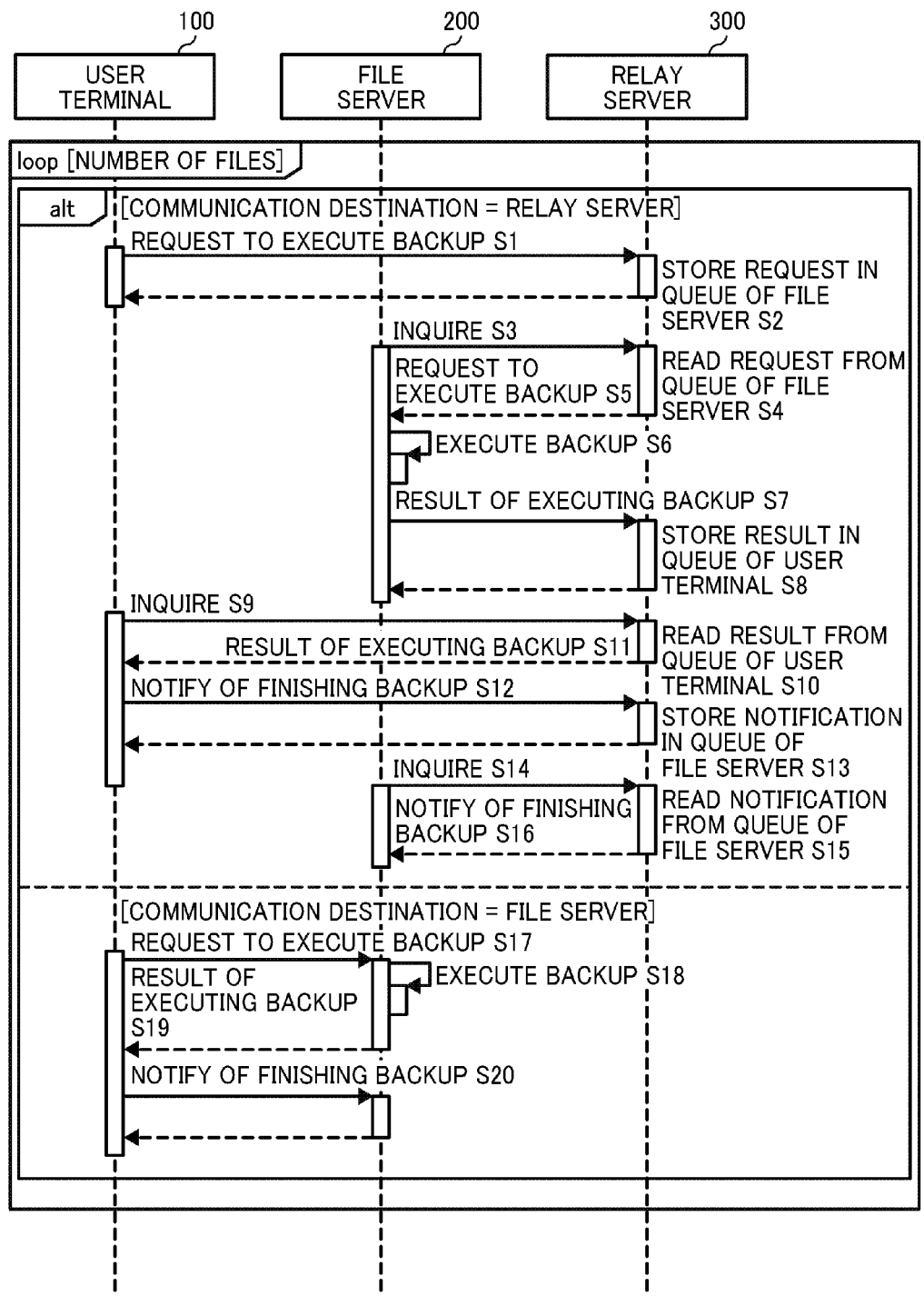
FIG. 12 is a sequence chart illustrating an operation performed by the information processing system during the backup process as an embodiment of the present invention.

In this embodiment, in S209 in the flowchart illustrating the operation of publishing the session ID performed by the session manager 209 in FIG. 9, in addition to transferring the published session ID and the communication method (HTTP communication), the point different from the first embodiment is that information specifying a destination of a request for backup (hereinafter referred to as destination information) is transferred to the user terminal 100. Here, the different point is described below with reference to a sequence chart in FIG. 12.

First, a case that the file server 200 transfers the session ID, the communication method (HTTP communication), and the destination information specifying the relay server 300 as the destination of the request for backup to the user terminal 100 is described below. In this case, the user terminal 100 establishes a session of HTTP communication with the relay server 300 specified by the received destination information using the received session ID. Subsequently, using the established session, the user terminal 100 transfers a request for backup specifying the file server 200 as the destination in S1. In response, the relay server 300 stores the request for backup received from the user terminal 100 in a queue in the file server 200 in S2.

After that, in response to an inquiry from the file server 200 in S3, the relay server 300 reads the request for backup specifying the file server 200 as the destination from the queue in S4 and transfers the read request for backup to the file server 200 using HTTP communication in S5. In response, the file server 200 performs the backup operation based on the request for backup obtained from the relay server 300 in S6. Subsequently, the file server 200 transfers the result of the backup operation to the relay server 300 specifying the user terminal 100 that requested the backup originally as the destination in S7. In response, the relay server 300 stores the result of the backup operation received from the file server 200 in a queue of the user terminal 100 in S2.

After that, in response to an inquiry from the user terminal 100, the relay server 300 reads the result of the backup operation specifying the user terminal 100 as the destination from the queue in S10 and transfers the read result of the backup operation to the user terminal 100 using HTTP communication in S11. In response, the user terminal 100 transfers a notification that the backup operation has ended specifying the file server 200 as the destination to the relay server 300 in S12, and the relay server 300 stores the notification that the backup operation has ended received from the user terminal 100 in a queue in the file server 200 in S13. Subsequently, in response to an inquiry from the file server 200 in S14, the relay server 300 reads the notification that the backup operation has ended specifying the file server 200 as the destination from the queue in S15 and the read notification that the backup operation has ended to the file server 200 using HTTP communication in S16.

By contrast, in a case that the file server 200 transfers the session ID, the communication method (HTTP communication), and the destination information specifying the relay server 300 as the destination of the request for backup to the user terminal 100, the similar operation as the first embodiment is performed. That is, the user terminal 100 transfers the request for backup to the file server 200 in S17, and, in response to that, the file server 200 performs the backup operation based on the received request for backup in S18. Subsequently, the file server 200 transfers the result of executing the backup operation to the user terminal 100 in S19, and, in response to that, the user terminal 100 transfers a notification that the backup operation has ended to the file server 200 in S20.

In other embodiment, it is possible to check availability of the bandwidth of the file server 200 and dynamically determines the destination of the request for backup based on the checked availability. More specifically, in S209 in the flowchart illustrating the operation of publishing the session ID performed by the session manager 209 in FIG. 9, an occupancy rate of the bandwidth of the file server 200 is checked. If the occupancy rate exceeds a predetermined threshold value, the relay server 300 is determined as the destination of the request for backup. Otherwise, if the occupancy rate does not exceed the predetermined threshold value, the file server 200 is determined as the destination of the request for backup. Otherwise, it is possible to determine the relay server 300 as the destination of the request for backup during a time zone when it is highly possible that a usage rate of the bandwidth of the file server 200 exceeds a predetermine threshold value. For example, it is possible to specify a time zone when the backup operations are concentrated based on a schedule of the regular backup operation preliminarily, and it is possible to determine the relay server 300 as the destination of the request for backup in a single uniform way during the specified time zone.

Furthermore, in other embodiments, it is possible to determine a way of cooperation between the file server 200 and the input/output apparatus 400 dynamically in accordance with the usage rate of the bandwidth of the file server 200. Regarding this case, cooperation between the file server 200 and the projector 40a is described below as an example.

Figure 13A:
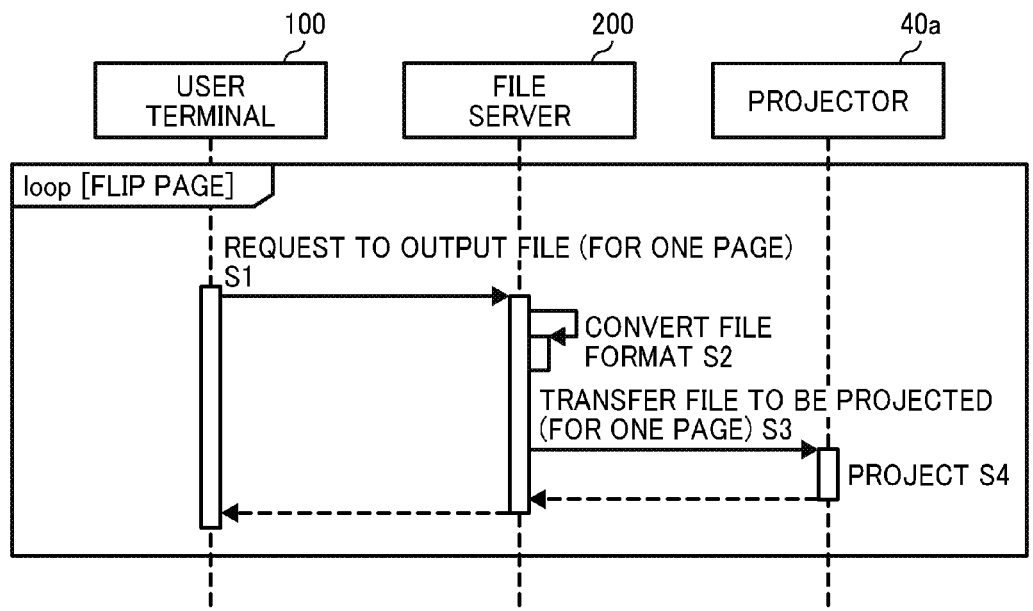
FIGS. 13A and 13B are sequence diagrams illustrating an operation performed by the information processing system in outputting a file as an embodiment of the present invention.
Figure 13B:
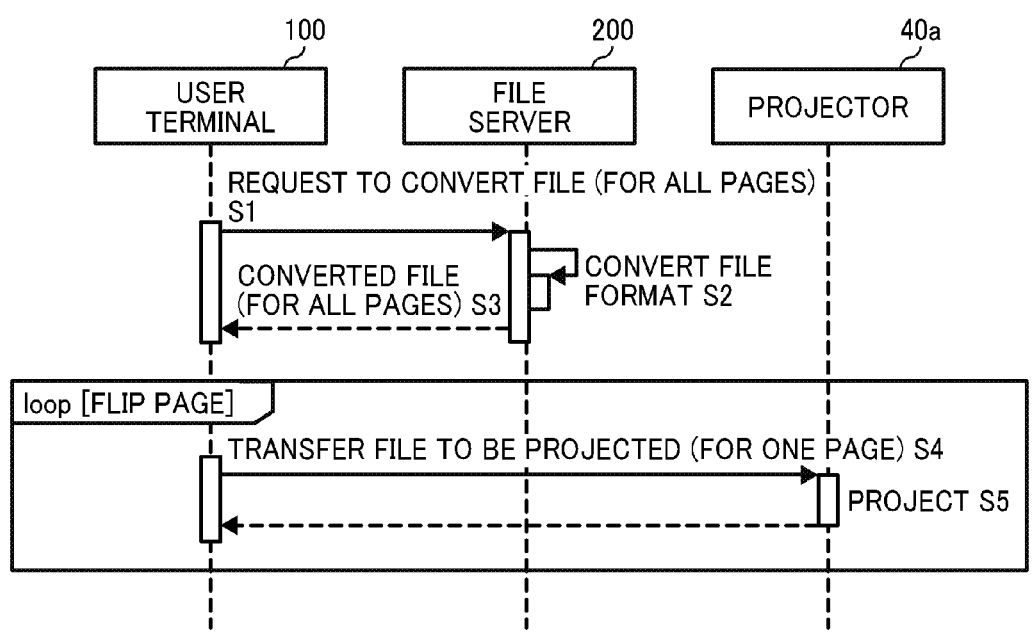

Here, in this system, it is possible to select either first configuration shown in FIG. 13A or second configuration shown in FIG. 13B. That is, in the first configuration shown in FIG. 13A, steps S1 to S4 are performed repeatedly every time a request to flip a page is issued by user operation. That is, the user terminal 100 requests the file server 200 to output one page in a file to be projected in S1. In response, the file server 200 converts the one page in the requested file into a projection file in a file format that the projector 40a can project in S2 and transfers the projection file to the projector 40a in S3. In response, the projector 40a projects the received projection file (for one page) in S4.

As described above, in the first configuration, during the projection period, it is required to maintain two sessions (i.e., a session between the user terminal 100 and the file server 200 and another session between the file server 200 and the projector 40a), and the two sessions are always occupied.

On the other hand, in the second configuration shown in FIG. 13B, first, the user terminal 100 requests the file server 200 to convert the file for all pages in S1. In response, the file server 200 converts the file for all pages into the projection file in S2 and provides the converted file to the user terminal 100 in S3. After that, every time a request to flip the page by user operation is issued, the user terminal 100 transfers the corresponding file to be projected (for one page) to the projector 40a in S4. In response, the projector 40a projects the received projection file (for one page) in S5.

As described above, in the second configuration, it is required to maintain the session between the user terminal 100 and the file server 200 only while the file is converted en bloc for the first time, and it is required to maintain one session between the file server 200 and the projector 40a only during the projection period.

In the assumption described above, if the usage rate of the bandwidth of the file server 200 does not exceed the predetermine threshold value, the file server 200 cooperates with the projector 40a using the first configuration. If the usage rate of the bandwidth of the file server 200 exceeds the predetermined threshold value (or it is highly possible to exceed the predetermined threshold value), the file server 200 cooperates with the projector 40a using the second configuration. As a result, during the time zone when the usage rage of the bandwidth of the file server 200 is high, possibility that a session is allocated to the backup operation becomes high.

While it is required to maintain the session between the file server 200 and the projector 40a during the projection period, it is not always required to keep maintaining a session after transferring a command to print to a printing apparatus such as the MFP during the printing period, and it is possible to discard the session in each case. Consequently, regarding the cooperation between the file server 200 and the printing apparatus, it is possible to always use the first configuration.

Figure 14A:
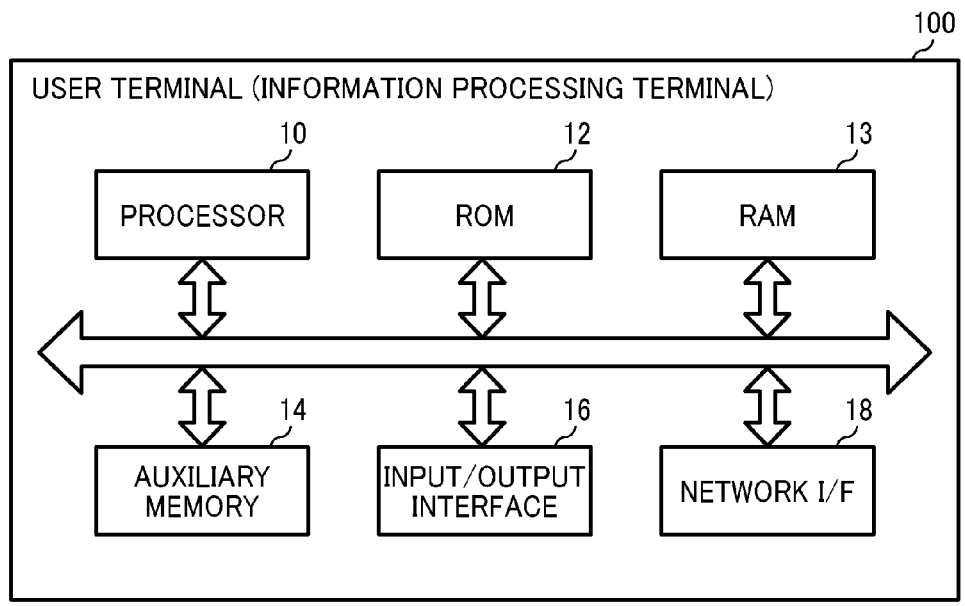
FIGS. 14A and 14B are diagrams illustrating a hardware configuration of apparatuses included in the information processing system as an embodiment of the present invention.
Figure 14B:
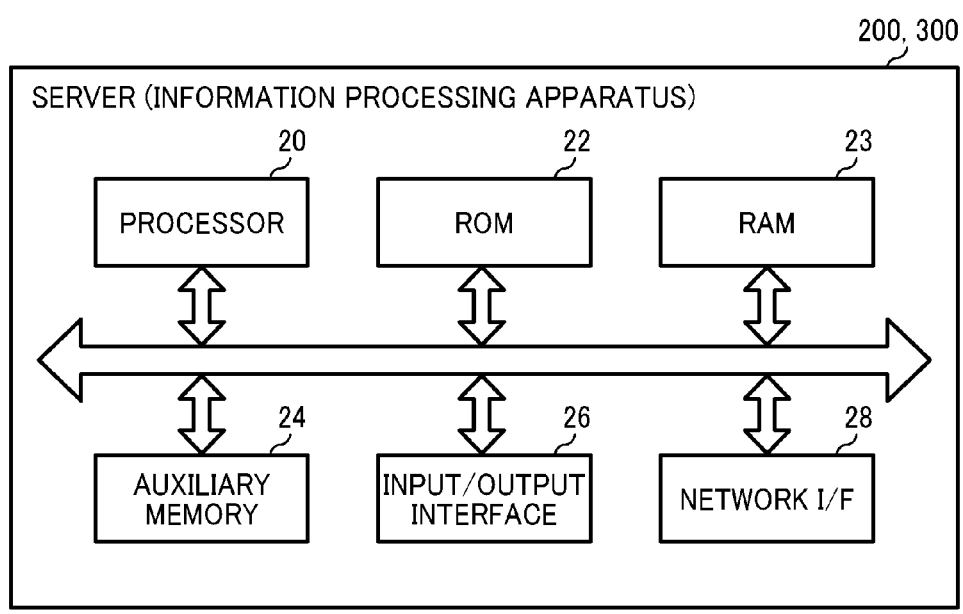

Lastly, hardware configurations of the user terminal 100 (information processing terminal) and each server (the file server 200 and the relay server 300) are illustrated in FIGS. 14A and 14B.

As shown in FIG. 14A, a computer that constructs the user terminal 100 (information processing terminal) at least includes a processor 10 that controls the entire apparatus, a ROM 12 that stores a boot program and a firmware program etc., a RAM 13 that provides an execution area for executing programs, an auxiliary memory 14 that stores an operating system (OS) 108 and various applications such as the terminal application described before and provides a data storage area 109, an input/output interface 16 that connects a control panel and a display etc., and a network interface 18 that connects to the LAN 60 and the WAN 70.

As shown in FIG. 14B, a computer that constructs each server (the file server 200 and the relay server 300) at least includes a processor 20 that controls the entire apparatus, a ROM 22 that stores a boot program and a firmware program etc., a RAM 23 that provides an execution area for executing programs, an auxiliary memory 24 that stores an operating system (OS) 210 and various applications such as the server application described before and provides a data storage area 211, an input/output interface 26 that connects a control panel and a display etc., and a network interface 28 that connects to the LAN 60 and the WAN 70.

The present invention also encompasses a non-transitory recording medium storing a program that executes an information processing method. The information processing method includes the steps of receiving a request for staring backup of data stored in an information processing terminal, from an information processing apparatus through a network, and allocating a session for backing up data to the information processing terminal based on a number of sessions each performing backup using a file-sharing communication protocol.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An information processing apparatus, comprising:
a receiver to receive a request for starting backup of data stored in an information processing terminal, from the information processing terminal through a network; and
circuitry to allocate a session for backing up of the data to the information processing terminal based on a number of sessions, each of the number of sessions performing backup using a file-sharing communication protocol, wherein the circuitry is further configured to
determine the file-sharing communication protocol as a communication protocol for the allocated session until the number of sessions each performing backup using the file-sharing communication protocol reaches an upper limit, and
determine a HTTP protocol as the communication protocol for the allocated session upon the number of sessions each performing backup using the file-sharing communication protocol reaching the upper limit.

2. An information processing system, comprising:
at least one information processing terminal; and
an information processing apparatus being a destination of back up of data stored in the information processing terminal,
the at least one information processing terminal including:
a transmitter to transmits a request for starting backup of data stored in the information processing terminal; and
circuitry to allocate a session for backing up the data to the at least one information processing terminal that requests backing up of the data based on a number of sessions, each of the number of sessions performing backup using a file-sharing communication protocol, wherein the circuitry is further configured to
determine the file-sharing communication protocol as a communication protocol for the allocated session until the number of sessions each performing backup using the file-sharing communication protocol reaches an upper limit, and
determine a HTTP protocol as the communication protocol for the allocated session upon the number of sessions each performing backup using the file-sharing communication protocol reaching the upper limit.

3. The information processing system of claim 2, wherein the transmitter of the at least one information processing terminal is configured to periodically transmit the request for starting backup of data to the information processing apparatus, and to transmit a notification indicating whether the backup succeeds or fails to the information processing apparatus, and
the circuitry of the information processing apparatus is configured to preferentially allocate a session to the at least one information processing terminal previously receiving the notification indicating that the backup fails.

4. The information processing system of claim 3, wherein, in response to receiving the notification indicating that the backup fails from the at least one information processing terminal, the information processing apparatus is configured to discard the session used for backing up the data.

5. The information processing system of claim 2, further comprising:
a relay apparatus to transfer the data addressed to a specified destination to the specified destination,
wherein, when a HTTP protocol is determined as a communication protocol, the circuitry of the at least one information processing terminal is configured to transfer the data addressed to the information processing apparatus as the destination to the relay apparatus to back up the data.

6. The information processing system of claim 2, wherein the file-sharing communication protocol is SMB protocol.

7. An information processing method comprising:
receiving a request for starting backup of data stored in an information processing terminal, from an information processing apparatus through a network;
allocating a session for backing up the data to the information processing terminal based on a number of sessions, each of the number of sessions performing backup using a file-sharing communication protocol;
determining the file-sharing communication protocol as a communication protocol for the allocated session until the number of sessions performing backup using the file-sharing communication protocol reaches an upper limit; and
determining a HTTP protocol as the communication protocol for the allocated session upon the number of sessions performing backup using the file-sharing communication protocol reaching the upper limit.

8. The information processing apparatus of claim 1, wherein the file-sharing communication protocol is SMB protocol.

9. The information processing method of claim 7, wherein the file-sharing communication protocol is SMB protocol.

* * * * *